United States Patent
Kim et al.

(10) Patent No.: US 10,353,536 B2
(45) Date of Patent: Jul. 16, 2019

(54) TERMINAL AND CONTROLLING METHOD THEREOF

(71) Applicant: LG ELECTRONICS INC., Seoul (KR)

(72) Inventors: Namki Kim, Seoul (JP); Yunmi Kwon, Seoul (JP); Kyunghye Seo, Seoul (JP); Yongmun Gong, Seoul (JP); Jongook Yoon, Seoul (JP); Hoonjoon Chi, Seoul (JP); Yoonhee Choi, Seoul (JP); Ahyun Park, Seoul (JP); Hyungjin Choi, Seoul (JP)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/584,492

(22) Filed: May 2, 2017

(65) Prior Publication Data

US 2018/0052583 A1  Feb. 22, 2018

(30) Foreign Application Priority Data

Aug. 18, 2016 (KR) .................. 10-2016-0104749

(51) Int. Cl.
*G06F 1/16* (2006.01)
*G06T 1/00* (2006.01)
*G06F 3/0481* (2013.01)
*G06F 3/0488* (2013.01)

(52) U.S. Cl.
CPC ...... *G06F 3/04815* (2013.01); *G06F 3/04812* (2013.01); *G06T 1/0007* (2013.01); *G06F 1/169* (2013.01); *G06F 3/04886* (2013.01); *G06F 2203/04802* (2013.01)

(58) Field of Classification Search
CPC ................ G06F 3/017; G06F 3/04815; G06F 2203/04802; G06F 17/212
See application file for complete search history.

(56) References Cited

U.S. PATENT DOCUMENTS

| | | | | |
|---|---|---|---|---|
| 2002/0166122 A1* | 11/2002 | Kikinis | ............... | H04N 5/44543 725/56 |
| 2006/0274060 A1* | 12/2006 | Ni | .................. | G06F 3/0482 345/419 |
| 2009/0309899 A1* | 12/2009 | Tytgat | ............... | G06F 3/04815 345/650 |
| 2009/0310933 A1* | 12/2009 | Lee | ................. | A61C 17/222 386/343 |
| 2010/0272187 A1* | 10/2010 | Civanlar | ......... | G11B 27/105 375/240.25 |
| 2013/0106831 A1* | 5/2013 | Lee | ................. | G06T 19/20 345/419 |
| 2013/0263059 A1* | 10/2013 | Amoraga Rodriguez | | G06F 3/0484 715/841 |
| 2014/0258472 A1* | 9/2014 | Shirey | ................ | H04L 67/2804 709/219 |

* cited by examiner

*Primary Examiner* — Haixia Du
(74) *Attorney, Agent, or Firm* — Birch, Stewart, Kolasch & Birch, LLP

(57) ABSTRACT

Disclosed are a terminal and operating method thereof. The present invention includes obtaining an input for selecting at least one video, displaying a polyhedron displaying a preview image of the selected at least one video on each of a plurality of faces, obtaining an input for selecting at least one of a plurality of the faces included in the displayed polyhedron, and outputting a video corresponding to the selected face.

18 Claims, 28 Drawing Sheets

FIG. 3
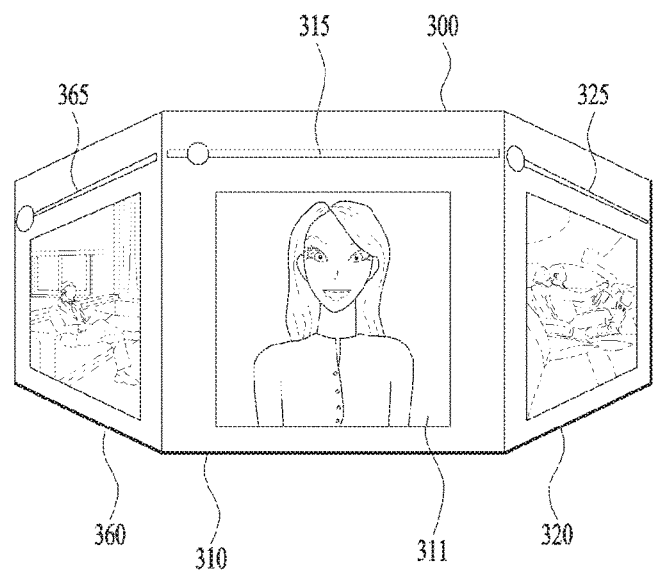
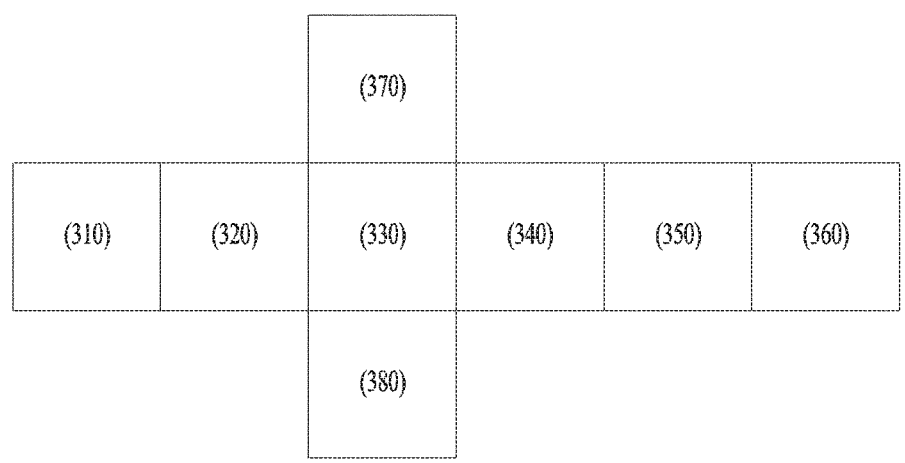

FIG. 10
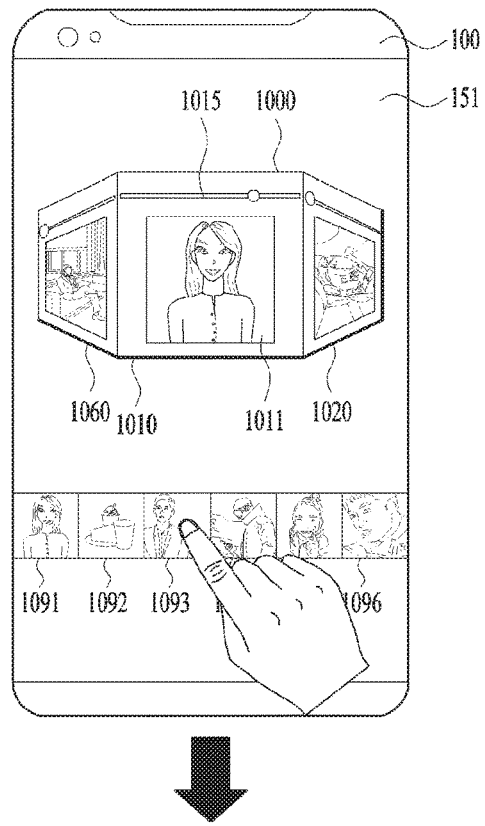
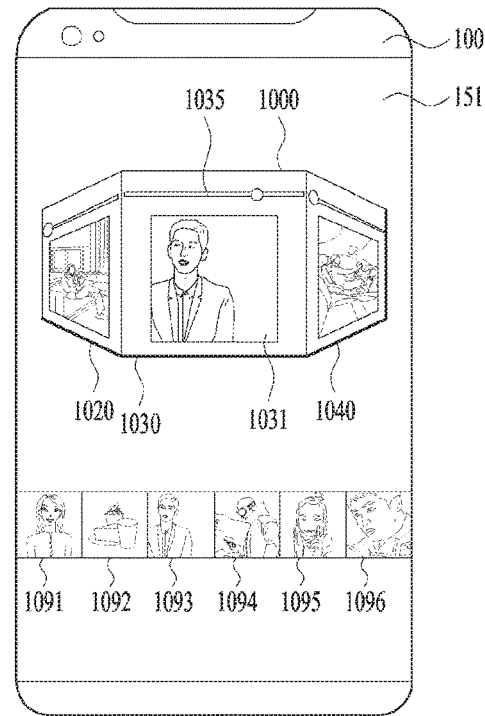

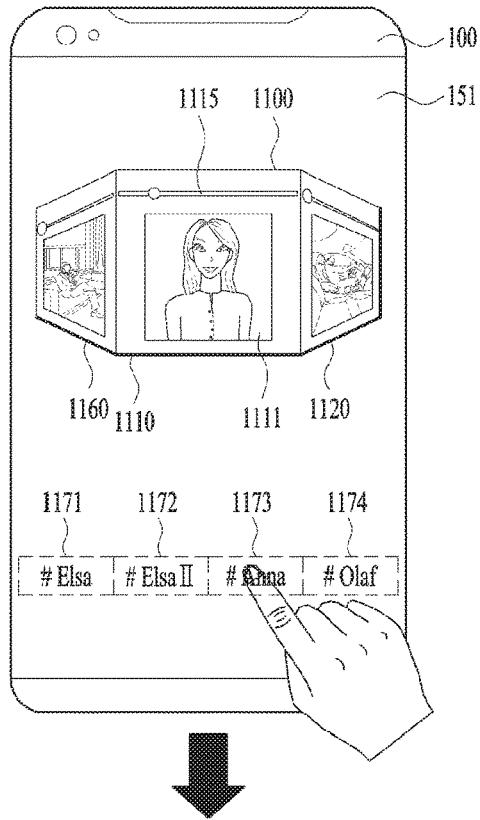
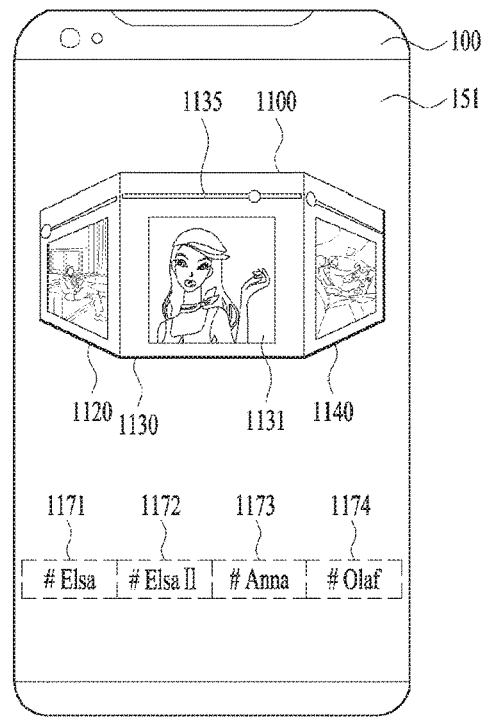
FIG. 11

FIG. 17
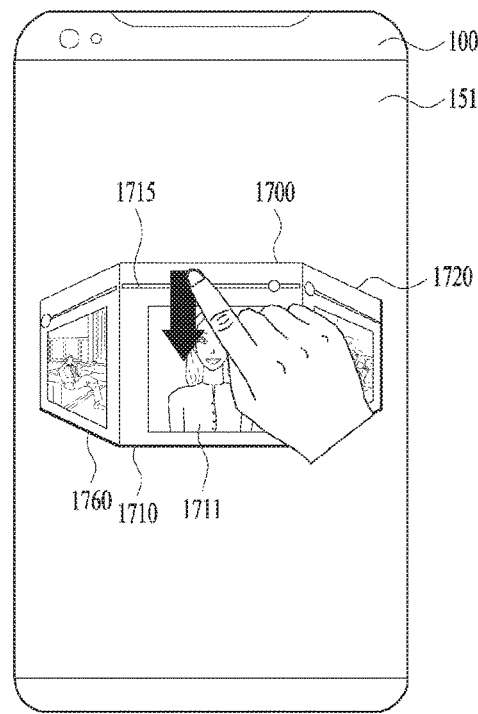
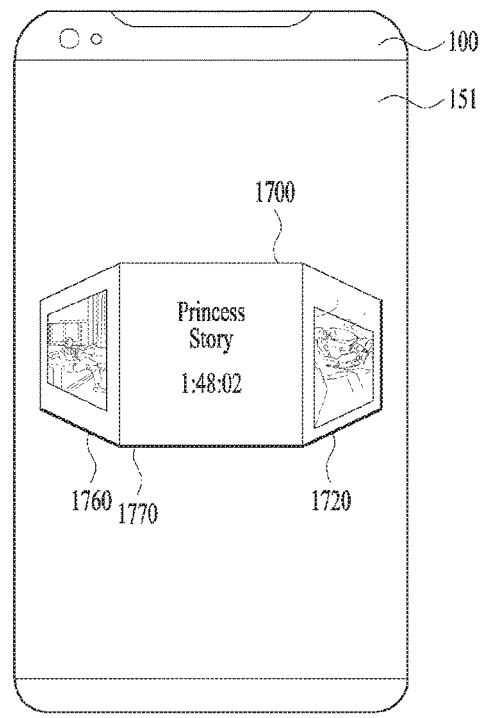

TERMINAL AND CONTROLLING METHOD THEREOF

Pursuant to 35 U.S.C. § 119(a), this application claims the benefit of earlier filing date and right of priority to Korean Application No. 10-2016-0104749, filed on Aug. 18, 2016, the contents of which are hereby incorporated by reference herein in their entirety.

BACKGROUND OF THE INVENTION

Field of the Invention

The present invention relates to a terminal, and more particularly, to a terminal and controlling method thereof. Although the present invention is suitable for a wide scope of applications, it is particularly suitable for providing a user interface configured to facilitate a search for contents.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Owing to the ongoing developments of functionality and performance of a terminal, a quality of a taken photo or a recorded video has been improved, and it is usual to appreciate a taken or downloaded photo or video displayed on a terminal.

Yet, a method of searching a recorded video fails to keep up with the development of the video shot or appreciation.

As in the past, in order to search or appreciate a video stored in a terminal, it is necessary to select a desired video from a list on which thumbnail images are simply arranged.

Unless lucky, a user has to make several searches for a desired video or a specific section of the video. Hence, the user inevitably consumes a considerable time to find a desired video or a specific section of a video.

Thus, although a user has taken a photo or video, the user does not need to find the photo or video unless there is a special event. And, such a photo or video may not be shared with other people.

SUMMARY OF THE INVENTION

Accordingly, embodiments of the present invention are directed to a terminal and controlling method thereof that substantially obviate one or more problems due to limitations and disadvantages of the related art.

One object of the present invention is to provide a terminal and controlling method thereof, which provides a user interface for searching for a user-desired content or a specific section of a desired content.

Another object of the present invention is to provide a user interface for editing and/or sharing a content.

Further object of the present invention is to provide a stereoscopic user interface, which provides a user with an intuitive manipulating mechanism.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a method of operating a terminal according to one embodiment of the present invention may include obtaining an input for selecting at least one video, displaying a polyhedron displaying a preview image of the selected at least one video on each of a plurality of faces, obtaining an input for selecting at least one of a plurality of the faces included in the displayed polyhedron, and outputting a video corresponding to the selected face.

The preview image displayed on each of a plurality of the faces may include a thumbnail image corresponding to each of the at least one video or a video of repeatedly playing a specific section of each of the at least one video.

The displaying the polyhedron displaying the preview image of the selected at least one video on each of a plurality of the faces may include displaying the preview image of each of a plurality of sections of a selected single video on each of a plurality of the faces of the polyhedron.

The displaying the polyhedron displaying the preview image of the selected at least one video on each of a plurality of the faces may include displaying the preview image of each of a plurality of selected videos on each of a plurality of the faces of the polyhedron.

The displaying the polyhedron displaying the preview image of the selected at least one video on each of a plurality of the faces may include displaying a progress bar of a video corresponding to each of a plurality of the faces.

The method may include obtaining an input for rotating the displayed polyhedron and displaying the rotated polyhedron in response to the obtained input.

The displaying the rotated polyhedron may include if obtaining an input of rotating the polyhedron in a top direction, displaying at least one of a summary video of the video corresponding to the polyhedron, a video of a significant section and a user's favorite video on a prescribed face of the polyhedron.

The displaying the rotated polyhedron may include if obtaining an input of rotating the polyhedron in a bottom direction, displaying video information of the video corresponding to the polyhedron on a prescribed face of the polyhedron.

The method may further include obtaining an input of flicking at least one of a plurality of the faces included in the polyhedron in a prescribed direction and deleting the preview image displayed on the face corresponding to the obtained flicking input.

The method may further include displaying at least one recommended video insertable in the preview image deleted face and displaying the preview image of the video selected from the displayed at least one recommended video on the preview image deleted face.

In another aspect of the present invention, as embodied and broadly described herein, a terminal according to one embodiment of the present invention may include a memory, a display unit displaying a video, and a controller configured to obtain an input for selecting at least one video, control the display unit to display a polyhedron displaying a preview image of the selected at least one video on each of a plurality of faces, and if obtaining an input for selecting at least one of a plurality of the faces included in the displayed polyhedron, output a video corresponding to the selected face.

The preview image displayed on each of a plurality of the faces may include a thumbnail image corresponding to each of the at least one video or a video of repeatedly playing a specific section of each of the at least one video.

The controller may control the display unit to display the preview image of each of a plurality of sections of a selected single video on each of a plurality of the faces of the polyhedron.

The controller may control the display unit to display the preview image of each of a plurality of selected videos on each of a plurality of the faces of the polyhedron.

The controller may control the display unit to display a progress bar of a video corresponding to each of a plurality of the faces.

The controller may obtain an input for rotating the displayed polyhedron and control the display unit to display the rotated polyhedron in response to the obtained input.

If obtaining an input of rotating the polyhedron in a top direction, the controller may control the display unit to display at least one selected from a summary video of the video corresponding to the polyhedron, a video of a significant section and a user's favorite video on a prescribed face of the polyhedron.

If obtaining an input of rotating the polyhedron in a bottom direction, the controller may control the display unit to display video information of the video corresponding to the polyhedron on a prescribed face of the polyhedron.

The controller may obtain an input of flicking at least one of a plurality of the faces included in the polyhedron in a prescribed direction and control the display unit to delete the preview image displayed on the face corresponding to the obtained flicking input.

The controller may control the display unit to display at least one recommended video insertable in the preview image deleted face and display the preview image of the video selected from the displayed at least one recommended video on the preview image deleted face.

Accordingly, embodiments of the present invention provide various effects and/or features.

First of all, a terminal according to an embodiment of the present invention can provide a user interface for searching for a user-desired content or a specific section of a desired content.

Secondly, the present invention can provide a user interface for editing and/or sharing a content.

Thirdly, the present invention provides a stereoscopic user interface, thereby providing a user with an intuitive manipulating mechanism.

Fourthly, the present invention can provide a user interface capable of searching various videos or images without creating a new video or data.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. The above and other aspects, features, and advantages of the present invention will become more apparent upon consideration of the following description of preferred embodiments, taken in conjunction with the accompanying drawing figures.

In the drawings:

FIG. 3 is a conceptual diagram of a polyhedral structure according to various embodiments of the present invention;

FIG. 10 is a diagram for an example of a thumbnail image display according to various embodiments of the present invention;

FIG. 11 is a diagram for an example of a hash tag display according to various embodiments of the present invention;

FIG. 17 is a diagram for an example of a video information display according to various embodiments of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
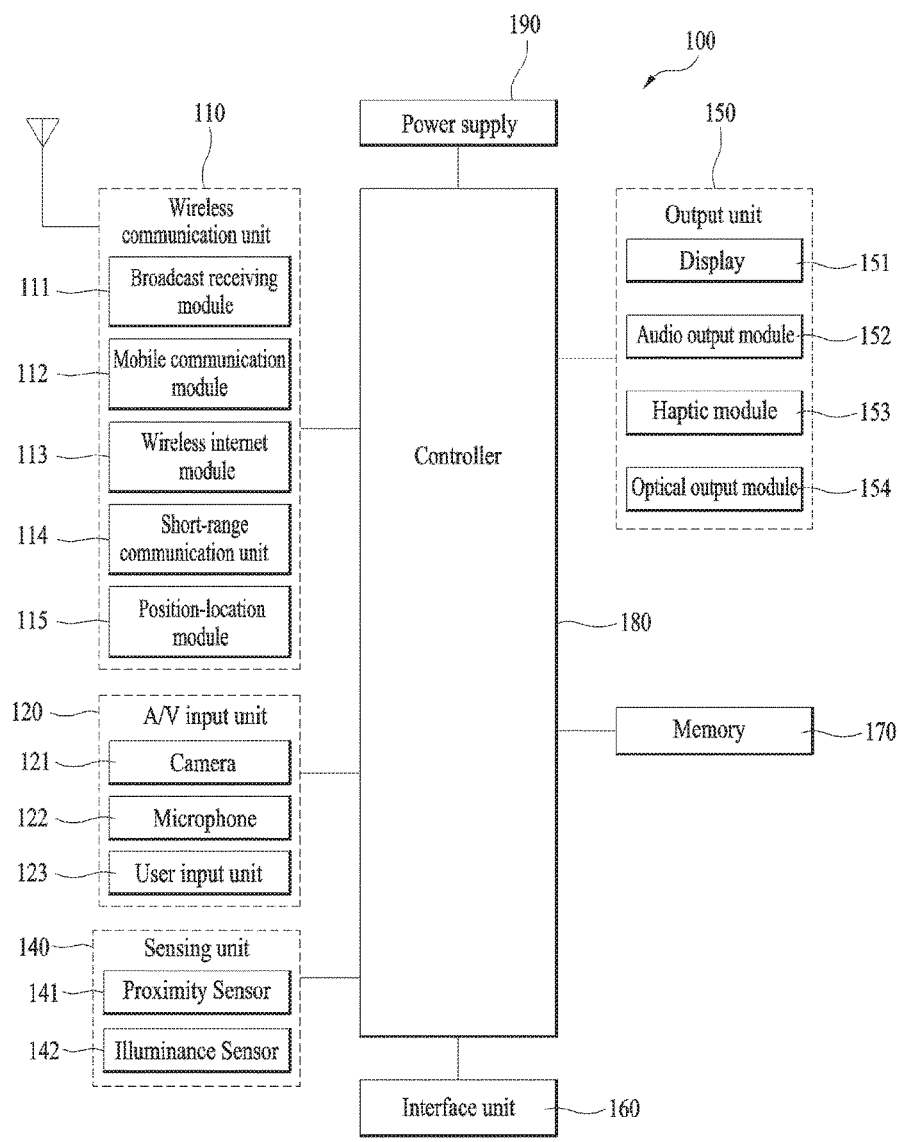
FIG. 1 is a block diagram to describe a terminal related to the present invention.

Reference is now made to FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel.

The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A terminal according to various embodiments of the present invention can display a preview image of at least one content on a user interface of a polyhedral type. Based on an input to a displayed polyhedron, the terminal can play a content and also display various informations on the content. Based on an input to a displayed polyhedron, the terminal may edit a content.

A polyhedron displayed by a terminal according to various embodiments of the present invention is described with reference to FIG. 2 as follows.

Figure 2:
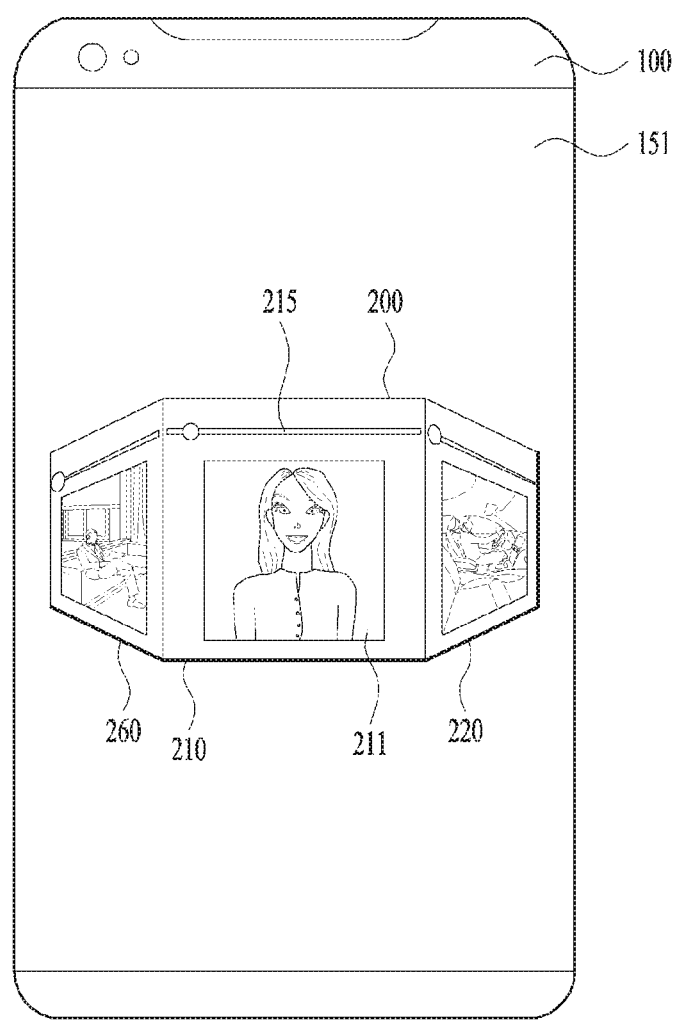
FIG. 2 is a diagram for an example of a polyhedron display according to various embodiments of the present invention.

FIG. 2 is a diagram for an example of a polyhedron display according to various embodiments of the present invention.

Referring to FIG. 2, the terminal 100 may display a polyhedron 200 including a plurality of faces on the display unit 151. For instance, the terminal 100 may display the polyhedron 200 having six faces 210, 220, 230, 240, 250 and 260 on a lateral side of its own. The terminal 100 may display preview images corresponding to different sections of a single content on a plurality of the faces included in the polyhedron 200, e.g., first to sixth faces 210, 220, 230, 240, 250 and 260, or display preview images corresponding to a plurality of contents on a plurality of the faces, respectively. Herein, the preview image may mean a thumbnail image or a video repeatedly playing a specific section or video. Hence, the terminal 100 may play videos corresponding to a plurality of the faces 210, 220, 230, 240, 250 and 260 on a plurality of the faces 210, 220, 230, 240, 250 and 260 included in the displayed polyhedron 200, respectively. The terminal 100 may display progress bars corresponding to a plurality of the faces on a plurality of the faces, respectively. An indicator indicating a point corresponding to a displayed preview image can be included in each of the displayed progress bars. For instance, the terminal 100 can display a preview image 211 of a first content on the first face 210, and may display a progress bar 215 of the first content thereon.

A structure of a polyhedron displayed by the terminal 100 is described with reference to FIG. 3.

FIG. 3 is a conceptual diagram of a polyhedral structure according to various embodiments of the present invention.

Referring to FIG. 3, a polyhedron 300 may have a plurality of faces. For instance, the polyhedron 300 may have six faces, e.g., first to sixth faces 310, 320, 330, 340, 350 and 360 on its lateral side. And, the polyhedron 300 may further include a top face 370 and a bottom face 380. A plurality of the faces included in the polyhedron 300 may correspond to a single content, or may correspond to a plurality of contents, respectively.

For instance, a plurality of the faces 310, 320, 330, 340, 350 and 360 included in the polyhedron 300 may correspond to predetermined sections of a single content, respectively. For one example, the first to sixth faces 310, 320, 330, 340, 350 and 360 included in the polyhedron 300 may correspond to first to sixth sections of a first content, respectively.

For another instance, a plurality of the faces 310, 320, 330, 340, 350 and 360 included in the polyhedron 300 may correspond to a plurality of contents, respectively. For one example, the first to sixth faces 310, 320, 330, 340, 350 and 360 included in the polyhedron 300 can correspond to first to sixth contents, respectively.

On each of a plurality of the faces included in the polyhedron 300, a progress bar corresponding to the corresponding face may be displayed, and a preview image of a content corresponding to the corresponding face may be included therein. For instance, the terminal 100 can display a preview image 311 of the first content corresponding to the first face 310 on the first face 310 of the polyhedron 300 and also display a progress bar 315 corresponding to the first content thereon. And, the terminal 100 may further display an indicator indicating a location corresponding to the displayed preview image 311 on the displayed progress bar 315.

Content information may be displayed on the top face 370 among a plurality of the faces included in the polyhedron 300, and a video related to a content (e.g., at least one of a summary video, a video of a significant section, a user's favorite video, etc.) may be displayed on the bottom face 370. This shall be described later.

A content included in or corresponding to the polyhedron 300 may include a video, which may be a video received through the wireless communication unit 110 as well as a video stored in the memory 170 of the terminal 100. For instance, a content included in or corresponding to the polyhedron 300 may include a video sent from a server (not shown). And, a content included in or corresponding to the polyhedron 300 may include an image such as a photo or the like.

The aforementioned polyhedron may be called a cube, and the polyhedron and the cube may be interchangeably used in the following description.

The terminal 100 according to various embodiments of the present invention may display a plurality of polyhedrons.

Figure 4:
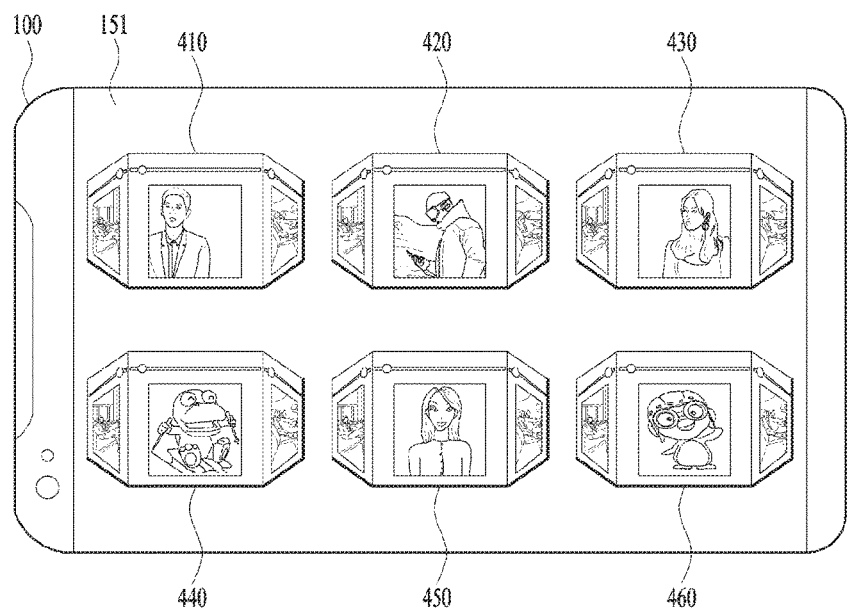
FIG. 4 is a diagram for an example of a plurality of polyhedron displays according to various embodiments of the present invention.

FIG. 4 is a diagram for an example of a plurality of polyhedron displays according to various embodiments of the present invention.

Referring to FIG. 4, the terminal may display a plurality of polyhedrons 410, 420, 430, 440, 450 and 460 on the display unit 151. For one example, the terminal 100 can display preview images corresponding to different contents on a plurality of faces included in each of a plurality of the polyhedrons 410, 420, 430, 440, 450 and 460, respectively. For another example, the terminal 100 enables different contents to correspond to a plurality of the polyhedrons 410, 420, 430, 440, 450 and 460, respectively and then displays preview images corresponding to different sections of a content corresponding to the corresponding polyhedron on a plurality of faces included in each of a plurality of the polyhedrons 410, 420, 430, 440, 450 and 460, respectively. For instance, the terminal 100 can display preview images corresponding to different sections of a first content on a plurality of faces included in the first polyhedron 410, respectively and also display preview images corresponding to different sections of a second content on a plurality of faces included in the second polyhedron 420, respectively.

Based on the above description, an operating method of a terminal according to various embodiments of the present invention is described as follows.

Figure 5:
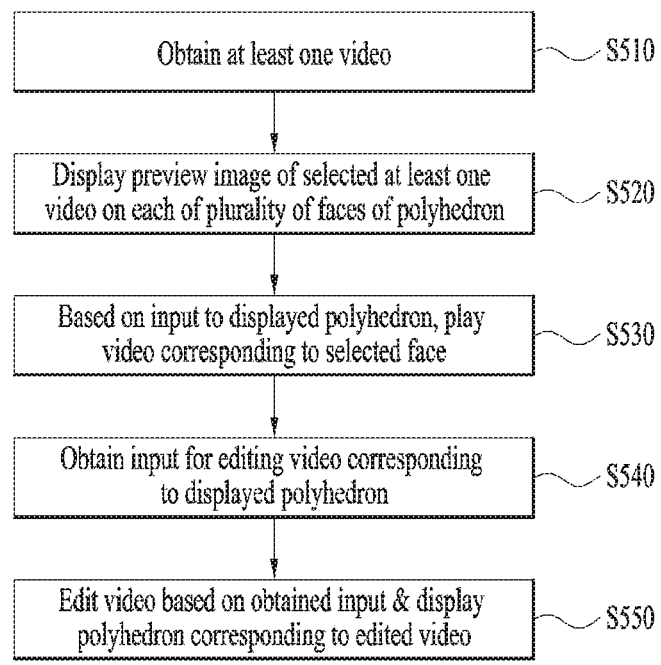
FIG. 5 is a flowchart for a method of operating a terminal according to various embodiments of the present invention.

FIG. 5 is a flowchart for a method of operating a terminal according to various embodiments of the present invention.

Referring to FIG. 5, the terminal 100 may obtain an input for selecting at least one video [S510].

For instance, the controller 180 can obtain an input for selecting at least one of a plurality of videos displayed on the display unit 151. For one example, the controller 180 may obtain a touch input for selecting at least one of a plurality of videos displayed on the display unit 151.

The terminal 100 may display a preview image of the selected at least one video on each of a plurality of faces of a polyhedron [S520].

For instance, the controller 180 can display preview images of a plurality of sections of a selected single video on a plurality of the faces of the polyhedron, respectively.

For another instance, the controller 180 can display preview images of a plurality of selected videos on a plurality of the faces of the polyhedron, respectively.

On a plurality of the faces of the polyhedron, the controller 180 may display progress bars for videos or sections of the videos corresponding to a plurality of the faces, respectively.

Meanwhile, the terminal 100 may display a plurality of polyhedrons on the display unit 151, and also display preview images of selected videos or sections of videos on a plurality of faces included in each of a plurality of the displayed polyhedrons, respectively.

Based on an input to the displayed polyhedron, the terminal 100 may play a video corresponding to a selected face [S530].

For instance, the controller 180 may obtain a selection input to the polyhedron displayed on the display unit 151 and then play a video corresponding to a selected face. For one example, the controller 180 can output the video corresponding to the selected face to the selected face on the displayed polyhedron. In doing so, the outputted video may include a fill video corresponding to the selected face or a partial section of the video corresponding to the selected face. For one example, the controller 180 can output a video corresponding to a preview image used to be displayed on the selected face. If the video corresponding to the selected face ends, the controller 180 may play a video corresponding to a next face. For instance, the controller 180 can play the video corresponding to the selected face. If the play ends, the controller 180 can play a video corresponding to another face in a prescribed direction.

A detailed embodiment of the above description is described with reference to FIGS. 6 to 8.

Figure 6:
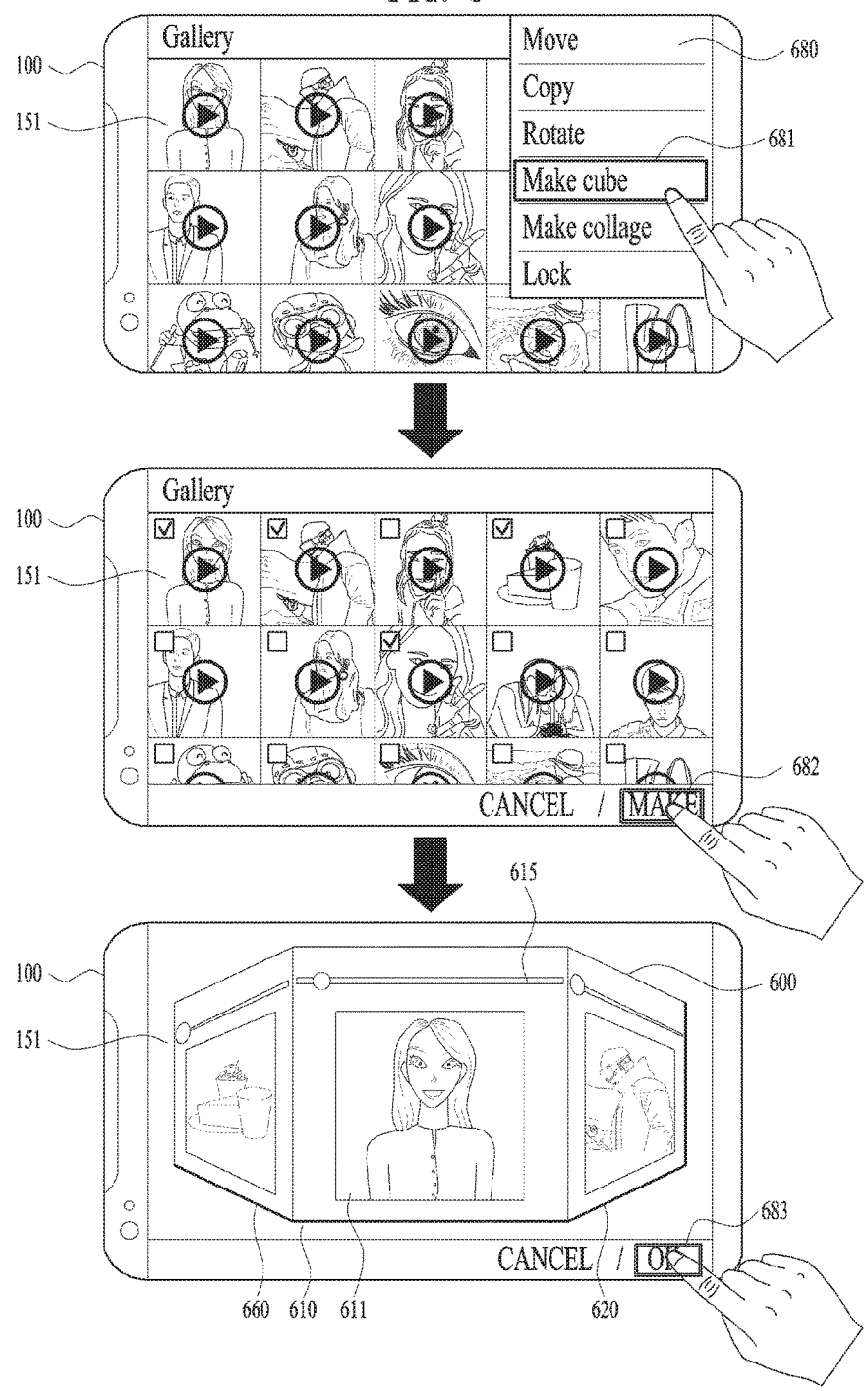
FIGS. 6 to 8 are diagrams for examples of a polyhedron creation and display according to various embodiments of the present invention.
Figure 7:
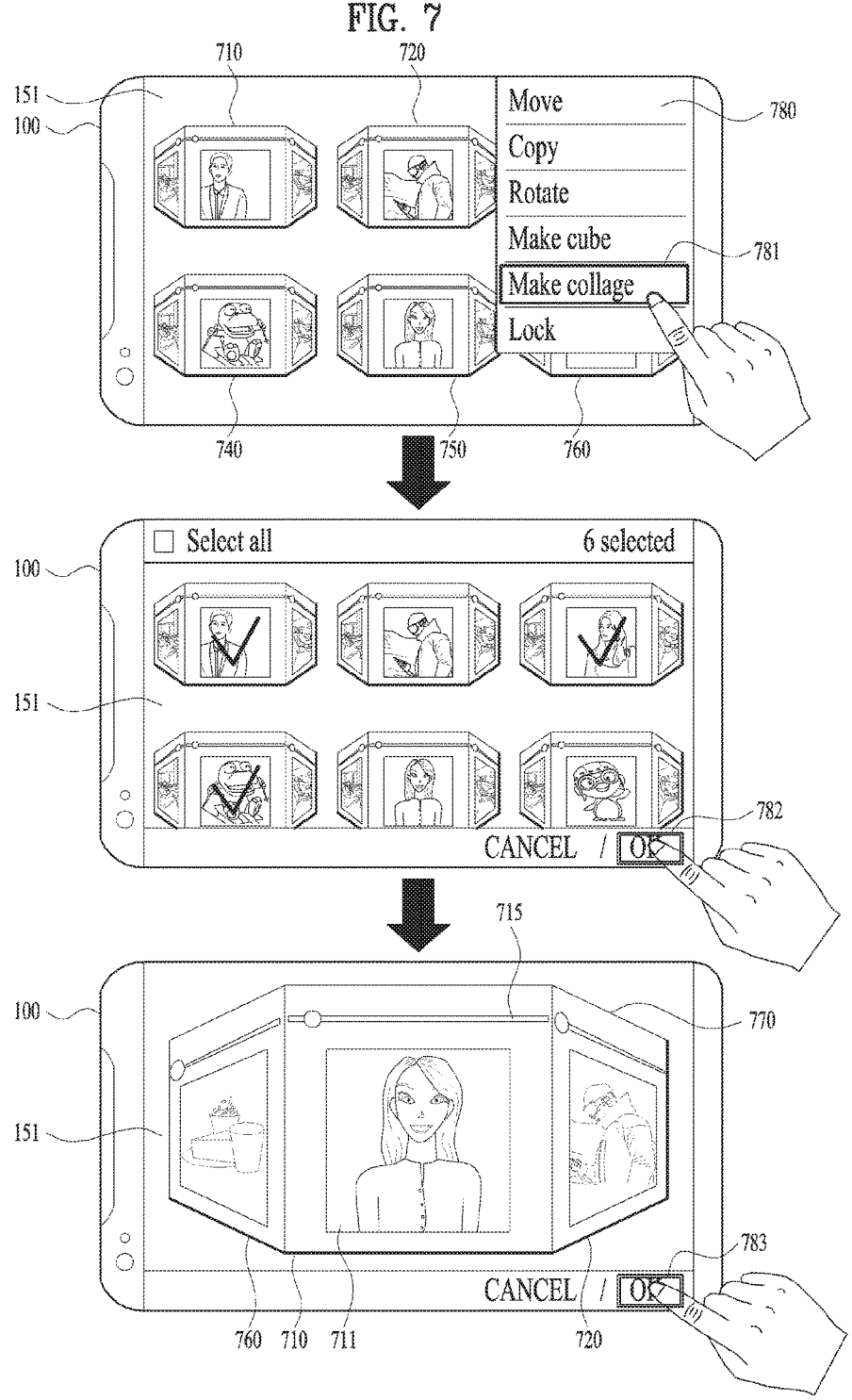
Figure 8:
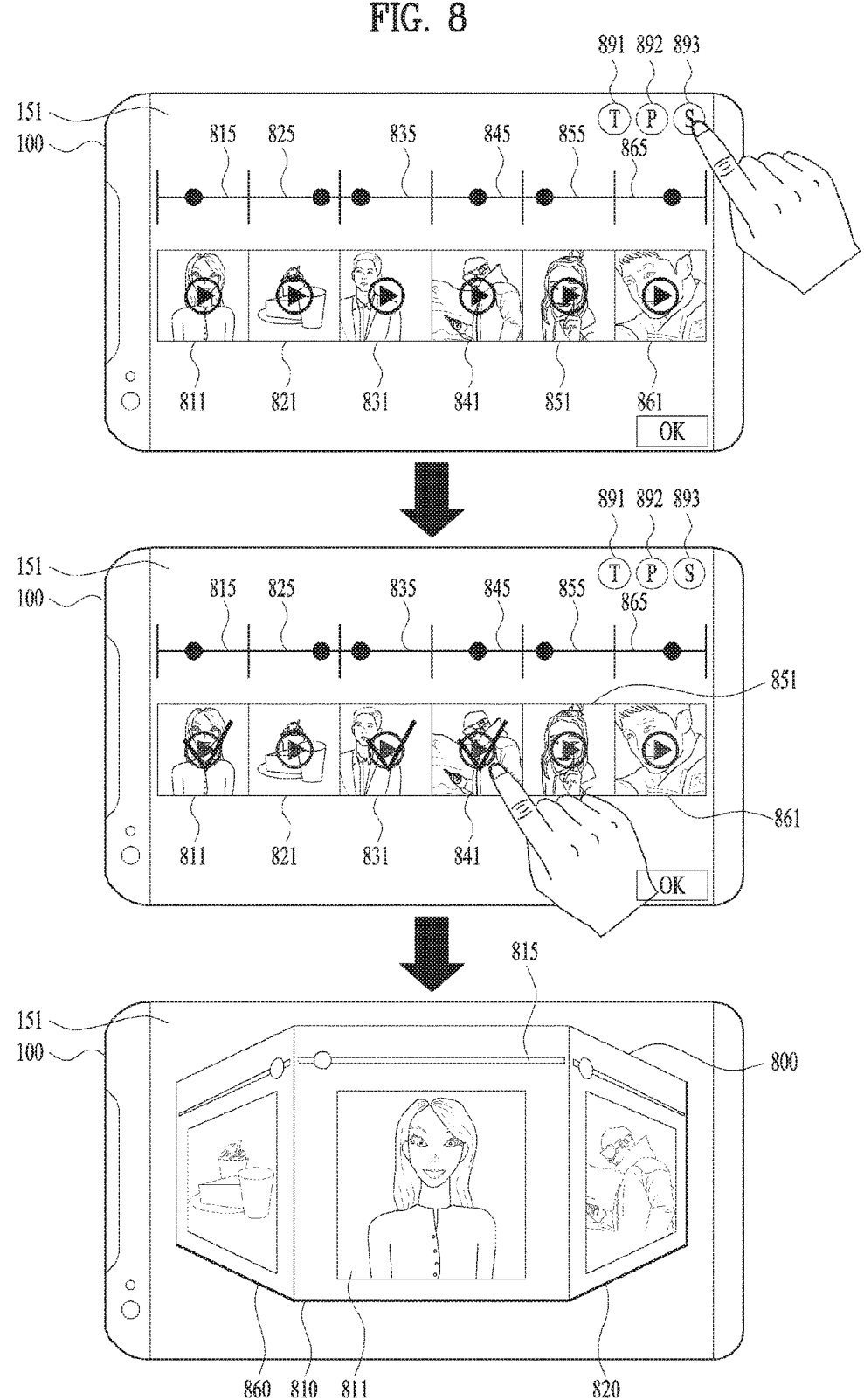

FIGS. 6 to 8 are diagrams for examples of a polyhedron creation and display according to various embodiments of the present invention.

Referring to FIG. 6, the terminal may display thumbnail images of a plurality of videos on the display unit 151. For instance, the controller 180 launches a gallery application and then displays thumbnail images of a plurality of images and videos on the display unit 151. The controller 180 may display a function menu 680 related to a plurality of the displayed images and videos. The controller 180 may obtain an input for creating a polyhedron. For instance, from the displayed function menu 680, the controller 180 can obtain an input of selecting a menu 681 for creating a polyhedron, e.g., a cube. If obtaining the input for creating the polyhedron, the controller 180 may obtain an input for selecting at least one video. For instance, the controller 180 can obtain inputs for selecting six videos and then obtain an input of selecting a MAKE menu 682. Based on the selected six videos, the controller 180 may display a polyhedron 600 on the display unit 151 and also display preview images of the selected six videos on a plurality of faces 610, 620, 630, 640, 650 and 660 included in the displayed polyhedron 600, respectively. For instance, the controller 180 can display a preview image 611 of a selected first content on a first face 610 among a plurality of the faces of the displayed polyhedron 600 and also display a progress bar 615 corresponding to the first content thereon. And, the controller 180 may display an indicator indicating a point corresponding to the displayed preview image 611 on the displayed progress bar 615. For other selected videos, the controller 180 may display preview images on other faces 620, 630, 640, 650 and 660 of the created polyhedron 600, respectively and also display progress bars thereon. Meanwhile, the controller 180 may obtain an input of confirmation (OK) 683 for the displayed polyhedron 600. If the OK menu 683 is inputted, the controller 180 may save the created polyhedron 600 or display the created polyhedron 600 on a polyhedron folder.

The terminal 100 according to various embodiments selects the created polyhedron, thereby creating a new polyhedron, e.g., a collage polyhedron. This is described with reference to FIG. 7.

Referring to FIG. 7, the terminal 100 may display a plurality of polyhedrons 710, 720, 730, 740, 750 and 760 on the display unit 151. The controller 180 may display a function menu 780 related to a plurality of the displayed polyhedrons 710, 720, 730, 740, 750 and 760. Based on a selected one of a plurality of the displayed polyhedrons, the controller 180 may obtain an input for creating a new polyhedron. For instance, from the displayed function menu 780, the controller 180 may obtain an input of selecting a menu 781 for creating a collage polyhedron, which is a new polyhedron, e.g., a collage cube. If obtaining an input for creating the collage polyhedron, the controller 180 may obtain an input of selecting a plurality of polyhedrons. For instance, the controller 180 can obtain an input for selecting 6 polyhedrons and then obtain an input of confirmation (OK) 782. Based on the selected six polyhedrons, the controller 180 may display a new polyhedron 700 on the display unit 151, and then display preview images of videos corresponding to the selected six polyhedrons on a plurality of the faces 710, 720, 730, 740, 750 and 760 included in the displayed polyhedron 700, respectively. For instance, the controller 180 can display a preview image 711 of a video corresponding to a selected first polyhedron on the first face 710 among a plurality of the faces of the displayed polyhedron 700 and also display a progress bar 715 of the video corresponding to the first polyhedron thereon. And, the controller 180 may display an indicator indicating a point corresponding to the displayed preview image 711 on the displayed progress bar 715. For the rest of the selected polyhedrons, the controller 180 may display previews image on the rest of the faces 720, 730, 740, 750 and 760 and also display progress bars thereon, respectively. Meanwhile, the controller 180 may obtain an input of confirmation (OK) 783 for the displayed polyhedron 700. If the OK menu 783 is inputted, the controller 180 may save the created polyhedron 700 or display the created polyhedron 700 on a polyhedron folder.

The terminal 100 according to various embodiments of the present invention may divide at least one video into a plurality of sections and then create a polyhedron including a selected one of the divided sections. This is described with reference to FIG. 8.

Referring to FIG. 8, the terminal 100 may divide at least one video into a plurality of sections and then display them. For instance, the controller 180 can display a planar figure that shows a plurality of unfolded faces included in a polyhedron created for at least one video. For one example, the controller 180 can display preview images 811, 821, 831, 841, 851 and 861 corresponding to first to sixth sections of a first content and then display progress bars 815, 825, 835, 845, 855 and 865 corresponding to the first to sixth sections, respectively. Herein, a plurality of the preview images 811, 821, 831, 841, 851 and 861 and a plurality of the progress bars 815, 825, 835, 845, 855 and 865 may be the elements included in a plurality of the faces of the polyhedron, respectively. The controller 180 may display a menu for a condition for creating (or making) a new polyhedron on the display unit 151. For instance, as the menu for the condition for creating the new polyhedron, the controller 180 can display a time condition 891, a person condition 892 and a scene condition 893 on the display unit 151. Based on a selected condition, the controller 180 may obtain a selection input to a video to be included in a polyhedron to be created, and then create the new polyhedron based on the selected condition and video. For one example, the controller 180 can receive a selection of the scene condition 893 and also receive selections of the first preview image 811, the third preview image 813 and the fourth preview image 814. Based on scenes of the video, the controller 180 may create a new polyhedron 800 including the sections of the video, which correspond to the selected first, third and fourth preview images 811, 813 and 814, respectively. For instance, the controller 180 can create the new polyhedron 800 having six faces. The controller 180 may display preview images corresponding to videos on the six faces 810, 820, 830, 840, 850 and 860 of the new polyhedron 800, and also display progress bars corresponding to the videos, respectively. Thus, the terminal 100 may divide the selected three sections or videos into six, and then display a new polyhedron including the divided six sections or videos as the respective faces on the display unit 151. Hence, based on the selected three sections or videos, the terminal 100 may create the new polyhedron having the six faces.

As mentioned in the foregoing description, based on at least one selected content, the terminal 100 may create and display a polyhedron having a plurality of faces on which preview images corresponding to a plurality of sections or videos are displayed, respectively.

If a prescribed one of a plurality of faces included in a displayed polyhedron is selected, the terminal 100 may play a content corresponding to the selected face. For instance, the controller 180 displays a polyhedron having a plurality of faces on the display unit 151. If obtaining an input for selecting a prescribed one of a plurality of the displayed faces, the controller 180 can play a video or a section of the video corresponding to the selected face. Based on an input to a progress bar, which is displayed on each of a plurality of the displayed faces or the video played face, the controller 180 can shift or move a preview image or a played video as well.

The terminal 100 can display a full progress bar for a polyhedron and at least one of a plurality of thumbnail images. This is described with reference to FIG. 9.

Figure 9:
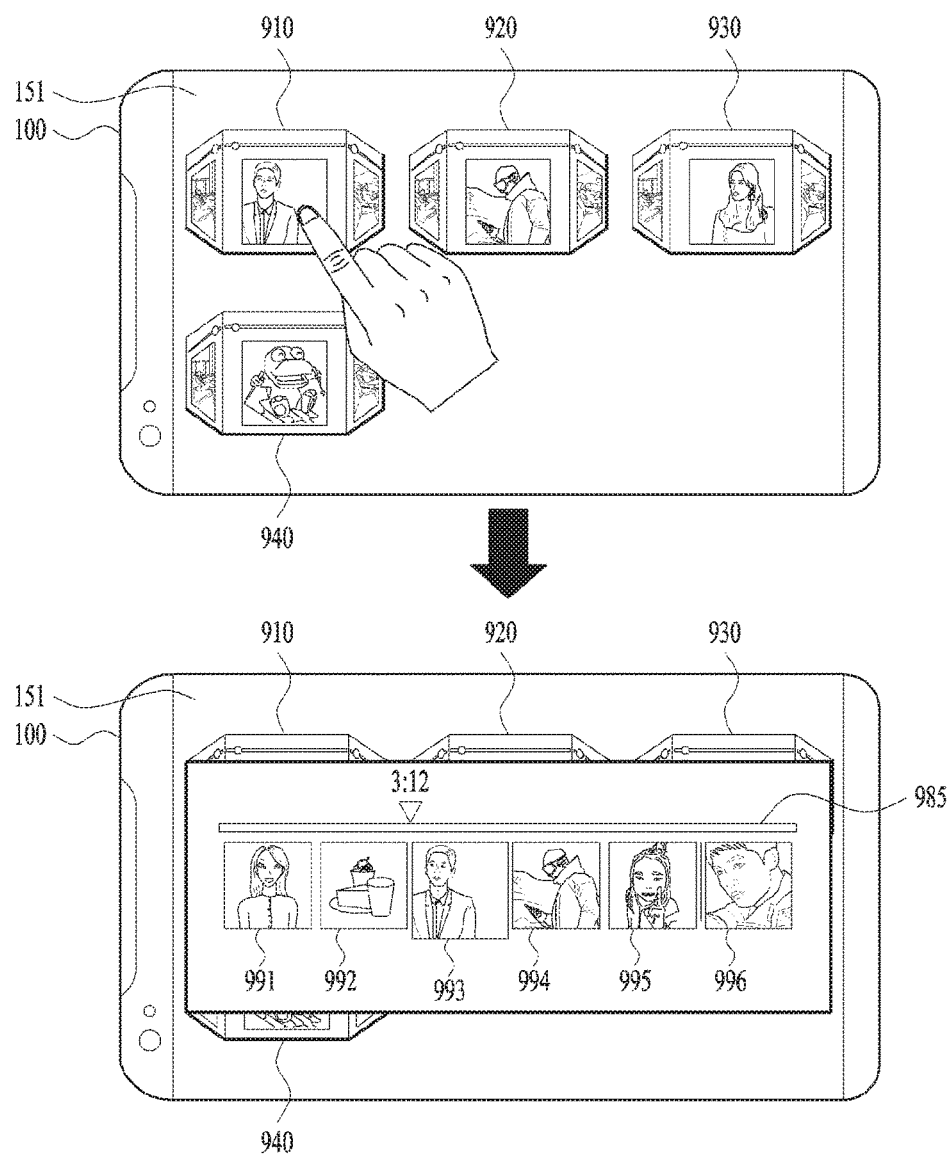
FIG. 9 is a diagram for an example of a full progress bar and thumbnail images for a polyhedron according to various embodiments of the present invention.

FIG. 9 is a diagram for an example of a full progress bar and thumbnail images for a polyhedron according to various embodiments of the present invention.

Referring to FIG. 9, the terminal 100 may display a plurality of polyhedrons 910, 920, 930, 940, 950 and 960 on the display unit 151. The controller 180 may obtain an input for displaying a full progress bar and thumbnail images for one of plurality of the displayed polyhedrons 910, 920, 930 and 940. For one example, as an input for displaying a full progress bar 985 and thumbnail images 991 to 996 for the selected first polyhedron 910, the controller 180 may obtain a long touch input of long pressing the first polyhedron 910. The controller 180 may display an information window 980 that displays the full progress bar 985 and the thumbnail images 991 to 996 for the selected first polyhedron 910. Particularly, the controller 180 may display the full progress bar 985 corresponding to full sections of at least one video included in the selected first polyhedron 910, and also display an indicator indicating a currently displayed point in the full sections. And, the controller 180 may display a plurality of the thumbnail images 991 to 996 for the at least one video included in the selected first polyhedron 910. Herein, each of a plurality of the thumbnail images 991 to 996 may include a thumbnail image per predetermined section of the at least one video included in the first polyhedron 910 or a thumbnail image corresponding to a significant scene. Thus, the terminal 100 may display a progress bar of full sections and per-section thumbnail images for a single polyhedron.

The terminal 100 according to various embodiments of the present invention can provide a thumbnail image or a hash tag for quickly searching or playing a desired section of a content. This is described with reference to FIG. 10 and FIG. 11.

FIG. 10 is a diagram for an example of a thumbnail image display according to various embodiments of the present invention.

Referring to FIG. 10, the terminal may display a polyhedron 1000 having a plurality of faces respectively corresponding to a plurality of videos. For instance, the controller 180 can display a preview image 1011 of a first video on a first face 1010 corresponding to the first video in the polyhedron 1000 and also display a progress bar 1015 for the first video thereon. The controller 180 may display a plurality of thumbnail images corresponding to a selected one of a plurality of the faces included in the displayed polyhedron 1000. For instance, if obtaining an input for selecting the first face 1010, the controller 180 can display a plurality of thumbnail images 1091 to 1096 indicating significant scenes included in the video corresponding to the first face 1010. If obtaining an input for selecting one of a plurality of the displayed thumbnail images 1091 to 1096, the controller 180 can play a video corresponding to the selected thumbnail image. For instance, if obtaining an input for selecting the third thumbnail image 1093, the controller 180 can play a section of the first video corresponding to the third thumbnail image 1093. Thus, the terminal 100 may display a thumbnail image for a video corresponding to each of a plurality of faces included in the polyhedron 1000 and play a section corresponding to a selected thumbnail image. Therefore, a user can play a desired section of a desired video with ease.

FIG. 11 is a diagram for an example of a hash tag display according to various embodiments of the present invention.

Referring to FIG. 11, the terminal may display a polyhedron 1100 having a plurality of faces respectively corresponding to a plurality of videos. For instance, the controller 180 can display a preview image 1111 of a first video on a first face 1110 corresponding to the first video in the polyhedron 1100 and also display a progress bar 1115 for the first video thereon. The controller 180 may display a plurality of hash tags corresponding to a selected one of a plurality of the faces included in the displayed polyhedron 1100. For instance, if obtaining an input for selecting the first face 1110, the controller 180 can display a plurality of hash tags 1171 to 1174, which are a plurality of words, to indicating significant scenes included in the video corresponding to the first face 1110, respectively. If obtaining an input for selecting one of a plurality of the displayed hash tags 1171 to 1174, the controller 180 can play a video corresponding to the selected hash tag. For instance, if obtaining an input for selecting the third hash tag 1173, the controller 180 can play a section of the first video corresponding to the third hash tag 1173. Thus, the terminal 100 may display a hash tag for a video corresponding to each of a plurality of faces included in the polyhedron 1100 and play a section corresponding to a selected hash tag. Therefore, a user can play a desired section of a desired video with ease.

Figure 12:
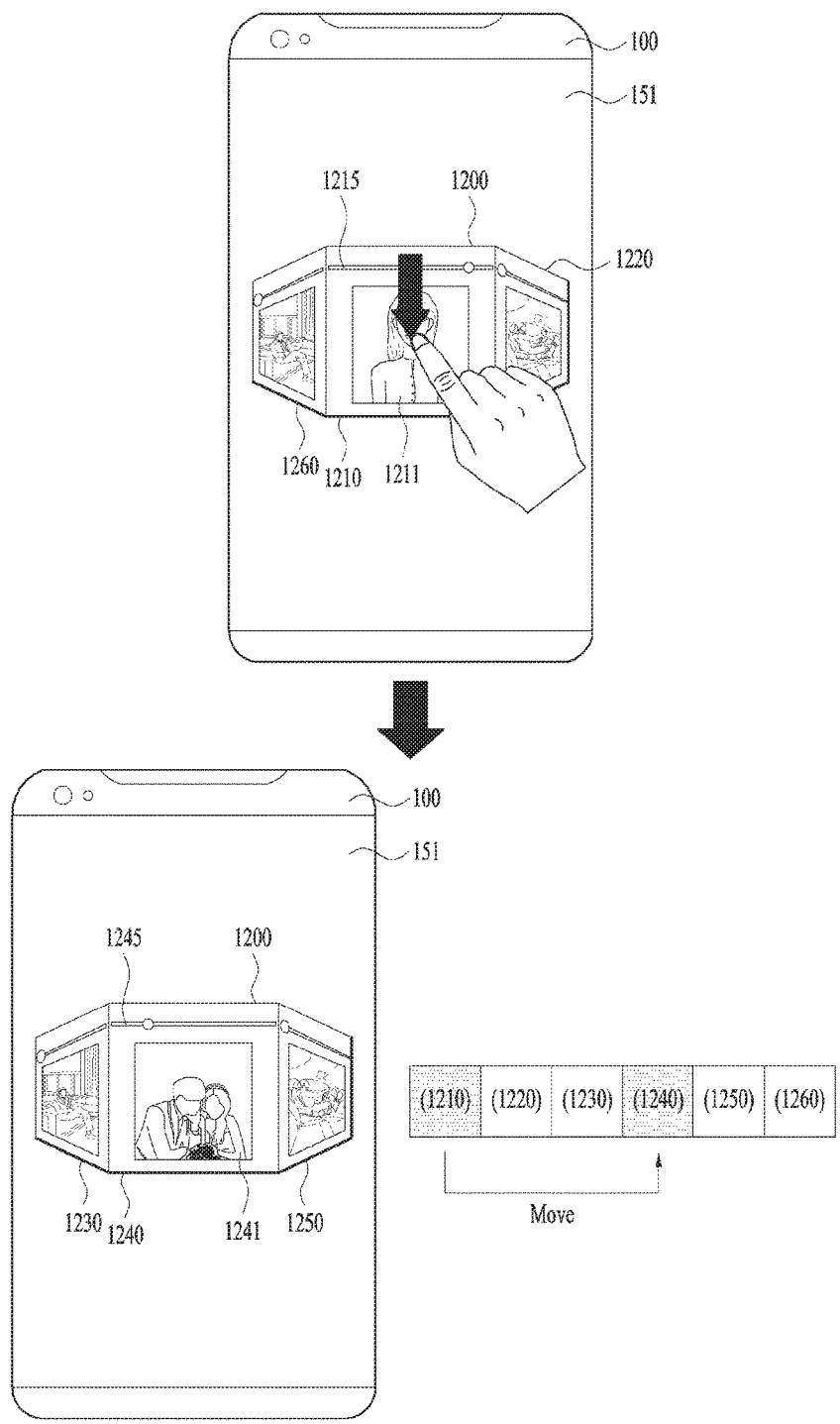
FIGS. 12 to 14 are diagrams for examples of a rotation of a polyhedron according to various embodiments of the present invention.
Figure 13:
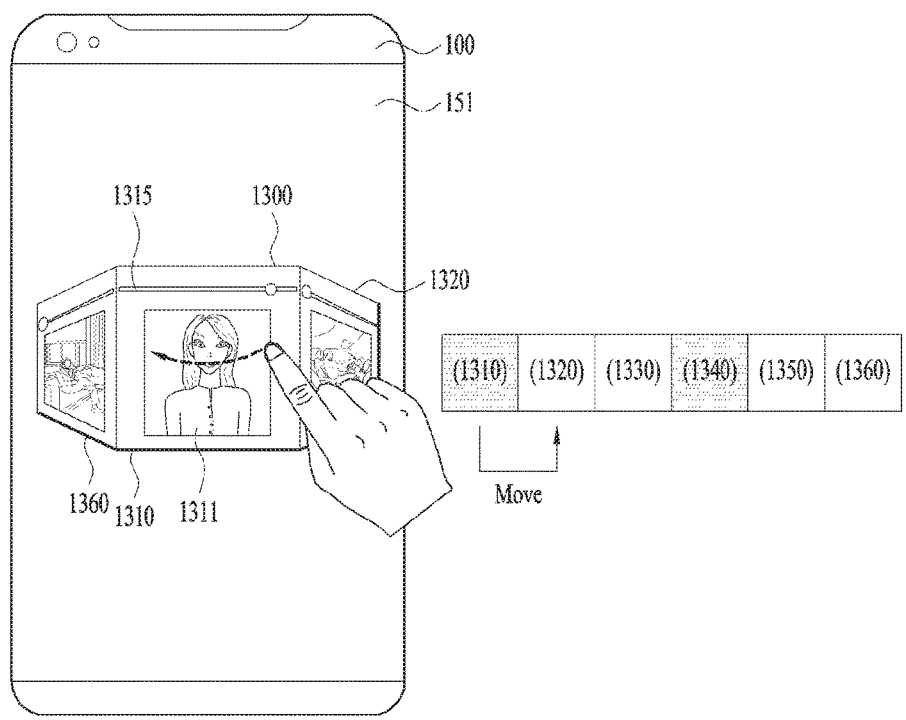
Figure 14:
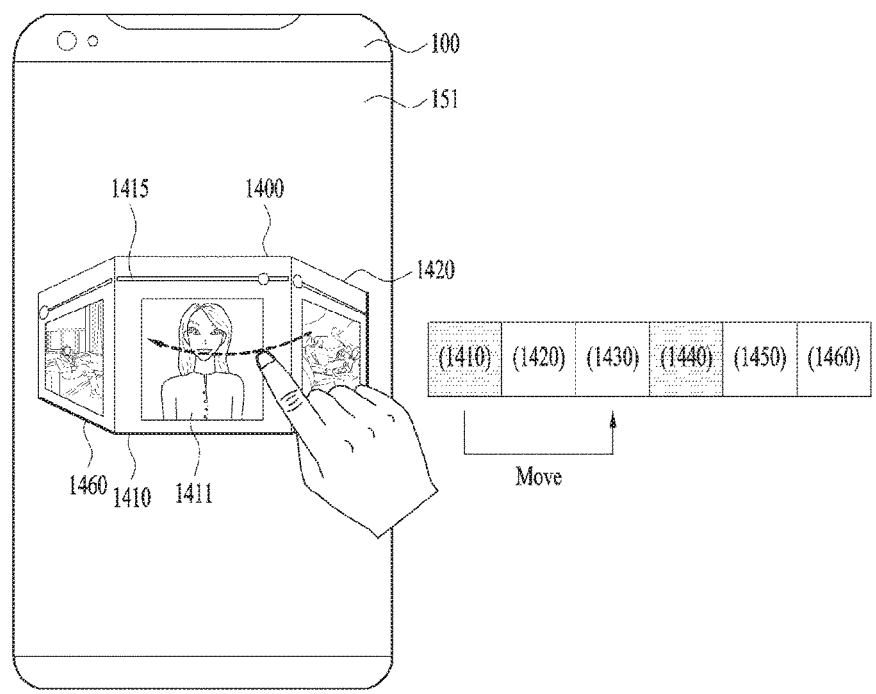

FIGS. 12 to 14 are diagrams for examples of a rotation of a polyhedron according to various embodiments of the present invention.

Referring to FIG. 12, the terminal 100 may display a polyhedron 1200 having a plurality of faces 1210, 1220, 1230, 1240, 1250 and 1260 on the display unit 151 and also display the first face 1210 on a front side of the polyhedron 1200. The controller 180 may obtain an input of dragging a top edge of the polyhedron 1200 in a bottom direction. In response to the obtained input, the controller 180 can rotate the displayed polyhedron 1200. Hence, the controller 180 may display the fourth face 1240 on a front side. Herein, the fourth face 1240 may correspond to a face opposite to the first face 1210 in the polyhedron 1200. Thus, in response to an input to the displayed polyhedron 1200, the terminal 100 can rotate the displayed polyhedron 1200. And, the terminal 100 may change the face displayed on the front side in response to the rotation of the polyhedron 1200. Thus, since a user can quickly search for a desired face through an input to a polyhedron, the user can quickly find a desired video or a specific section of the desired video.

Referring to FIG. 13, the terminal 100 may display a polyhedron 1300 having a plurality of faces 1310, 1320, 1330, 1340, 1350 and 1360 on the display unit 151 and also display the first face 1310 on a front side of the polyhedron 1300. The controller 180 may obtain an input of dragging the first face 1310 of the polyhedron 1300 in a left direction. In response to the obtained input, the controller 180 can rotate the displayed polyhedron 1300. Hence, the controller 180 may display the second face 1320 on the front side. Herein, the second face 1320 may correspond to a face used to be displayed on a right side of the first face 1310 in the polyhedron 1300. Thus, in response to an input to the displayed polyhedron 1300, the terminal 100 can rotate the displayed polyhedron 1300. And, the terminal 100 may change the face displayed on the front side in response to the rotation of the polyhedron 1300. Thus, since a user can quickly search for a desired face through an input to a polyhedron, the user can quickly find a desired video or a specific section of the desired video.

Referring to FIG. 14, the terminal 100 may display a polyhedron 1400 having a plurality of faces 1410, 1420, 1430, 1440, 1450 and 1460 on the display unit 151, display the first face 1410 on a front side of the polyhedron 1400, and also display the second face 1420 on a right side of the first face 1410. The controller 180 may obtain an input of dragging the second face 1420 of the polyhedron 1400 in a left direction. In response to the obtained input, the controller 180 can rotate the displayed polyhedron 1400. Hence, the controller 180 may display the third face 1430 on the front side. Herein, the third face 1430 may correspond to a face used to be displayed on a right side of the second face 1420 in the polyhedron 1400. Thus, in response to a user input for rotating the displayed polyhedron 1400, the terminal 100 may differentiate a rotation degree of the polyhedron 1400 and also display a face displayed on a front side of the rotated polyhedron 1400 differently. Therefore, since a user can quickly search for a desired face through an input to a polyhedron, the user can quickly find a desired video or a specific section of the desired video.

The terminal 100 according to various embodiments can simultaneously play videos respectively corresponding to a plurality of faces in response to an input to the polyhedron 1400. This is described with reference to FIG. 15.

Figure 15:
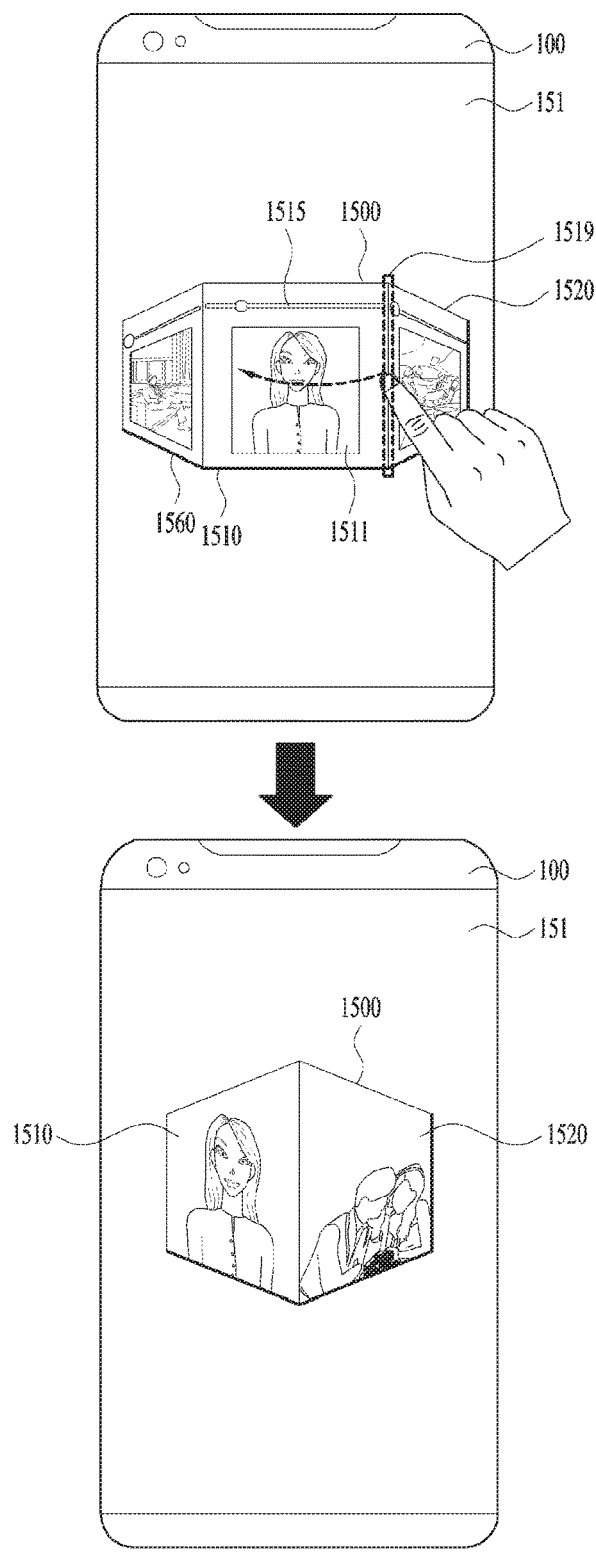
FIG. 15 is a diagram for an example of a plurality of video plays according to various embodiments of the present invention.

FIG. 15 is a diagram for an example of a plurality of video plays according to various embodiments of the present invention.

Referring to FIG. 15, the terminal 100 may display a polyhedron 1500 having a plurality of faces on the display unit 151. For instance, the terminal 100 may display a first face 1510 on a front side of the polyhedron 1500, display a fifth face 1560 on a left side of the first face 1510, and also display a second face 1520 on a right side of the first face 1510. And, a plurality of the faces included in the polyhedron 1500 may correspond to different videos, respectively. The controller 180 may obtain an input of dragging an edge between the first and second faces 1510 and 1520 of the polyhedron 1500 in a left direction. Based on the obtained input, the controller 180 may display the polyhedron 1500 rotated partially. For instance, the controller 180 can control the polyhedron 1500 to be rotated in part so that both of the first and second faces 1510 and 1520 of the polyhedron 1500 can face a front direction simultaneously. Subsequently, the controller 180 may play a video corresponding to the first face 1510 on the displayed first face 1510 and also play a video corresponding to the second face 1520 on the second face 1520. Hence, the terminal 100 can simultaneously play different videos respectively corresponding to different faces. Therefore, a user can simultaneously compare a plurality of the played videos with each other.

Based on an input to a polyhedron, the terminal 100 according to various embodiments of the present invention may display information on a video corresponding to the polyhedron and a video related to the polyhedron. This is described with reference to FIG. 16 and FIG. 17.

Figure 16:
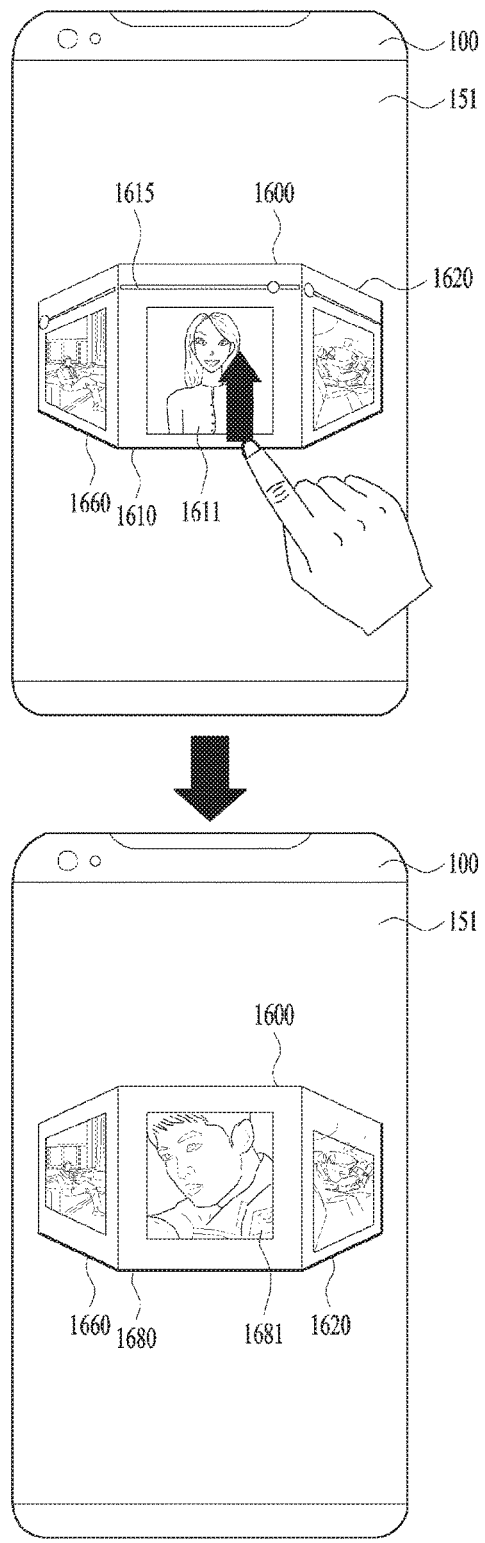
FIG. 16 is a diagram for an example of a summary video play according to various embodiments of the present invention.

FIG. 16 is a diagram for an example of a summary video play according to various embodiments of the present invention.

Referring to FIG. 16, the terminal 100 may display a polyhedron 1600 having a plurality of faces on the display unit 151. The terminal 100 may obtain an input of dragging a bottom edge of the polyhedron 1600 in a top direction. In response to the obtained input, the controller 180 may rotate the displayed polyhedron 1600. Hence, the controller 180 may display a bottom face of the polyhedron 1600, e.g., an eighth face 1680 on a front side. For one example, the controller 180 may play a summary video 1681 of a video corresponding to the polyhedron 1600 on the eighth face 1680. For another example, the controller 180 can play a significant video of a video corresponding to the polyhedron 1600, or may play a user's favorite section of the video corresponding to the polyhedron 1600. Moreover, the terminal 100 may classify a summary video, a significant video, a video of a favorite section and the like, which are displayed on the eighth face 1680 of the polyhedron 1600 into a separate folder. Hence, the terminal 100 can provide a summary video, a significant video, a video of a favorite section and the like of each of a plurality of polyhedrons using a single folder.

FIG. 17 is a diagram for an example of a video information display according to various embodiments of the present invention.

Referring to FIG. 17, the terminal 100 may display a polyhedron 1700 having a plurality of faces on the display unit 151. The terminal 100 may obtain an input of dragging a top edge of the polyhedron 1600 in a bottom direction. Herein, the input of dragging the top edge of the polyhedron 1700 in the bottom direction may include an input different from that shown in FIG. 12. For instance, the drag input shown in FIG. 12 and the input shown in FIG. 17 may differ from each other in at least one of a drag length, an input strength and an input time. In response to the obtained input, the controller 180 may rotate the displayed polyhedron 1700. Hence, the controller 180 can display a top face of the polyhedron 1700, e.g., a seventh face 1770 on the front side. For example, the controller 180 may display video information of a video corresponding to the polyhedron 1700 on the seventh face 1770. Herein, the video information may include various informations related to the video. For instance the video information may include various informations on the video such as a title, a play time, a created date, a bit rate, a codec, a language, etc.

Based on an input to at least one polyhedron, the terminal 100 according to various embodiments of the present invention may edit a video and play the edited video. This is described with reference to FIG. 5 again.

Referring to FIG. 5, the terminal 100 may obtain an input for editing the video corresponding to the polyhedron displayed on the display unit 151 [S540]. Based on the obtained input, the terminal 100 may edit the video and also display a polyhedron corresponding to the edited video [S550].

Figure 18:
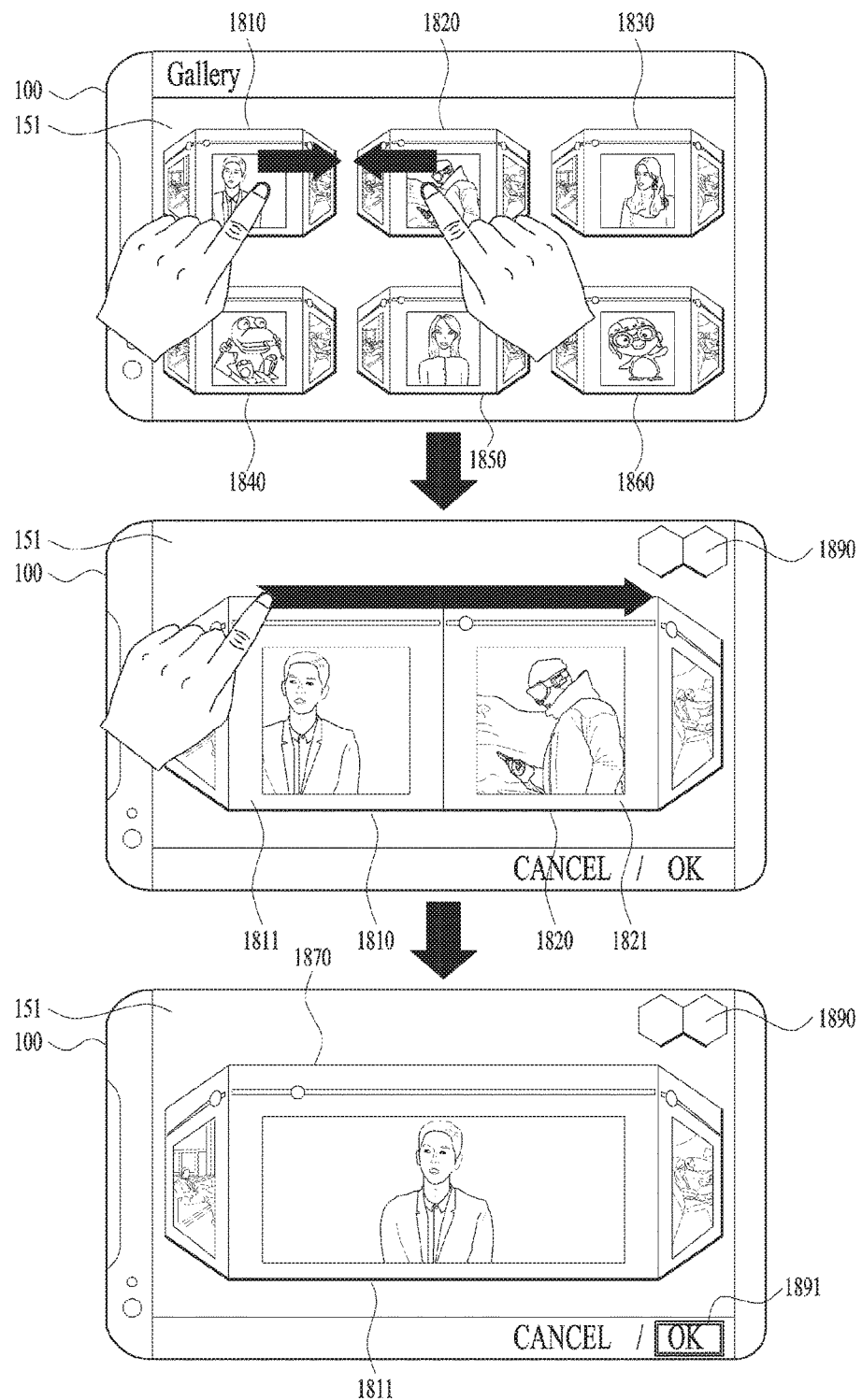
FIG. 18 is a diagram for an example of a plurality of video connected plays according to various embodiments of the present invention.
Figure 19:
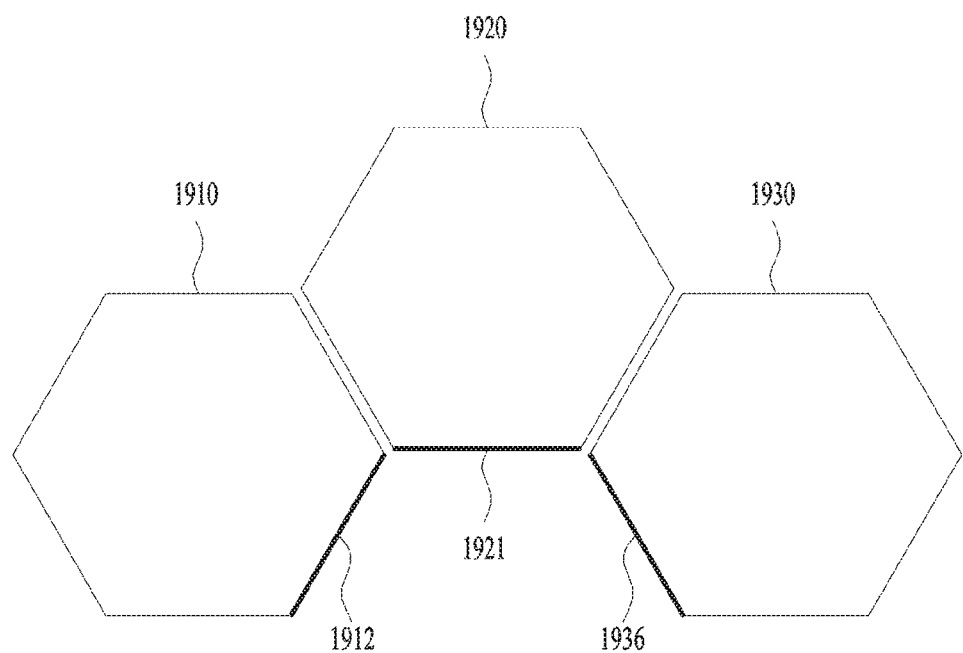
FIG. 19 is a cross-sectional diagram for connected polyhedrons according to various embodiments of the present invention.

With reference to FIG. 18 and FIG. 19, based on an input to a displayed polyhedron of the terminal 100, an embodiment of editing a video and displaying a polyhedron corresponding to the edited video is described.

FIG. 18 is a diagram for an example of a plurality of video connected plays according to various embodiments of the present invention.

Referring to FIG. 18, the terminal 100 may display a plurality of polyhedrons 1810, 1820, 1830, 1840, 1850 and 1860 on the display unit 151. The terminal 100 may obtain an input for playing a plurality of videos respectively corresponding to a plurality of the polyhedrons connectively. Herein, playing a plurality of videos connectively may be referred to as a connective play. For one example, the controller 180 may obtain an input for merging one face of the displayed first polyhedron 1810 and one face of the displayed second polyhedron 1820 together. For instance, the controller 180 may obtain an input of pinching in a first face 1811 of the first polyhedron 1810 and a second face 1821 of the second polyhedron 1820. If obtaining the input for merging one face of the first polyhedron 1810 and one face of the second polyhedron 1820 together, the controller 180 may display the first polyhedron 1810 and the second polyhedron 1820 in a manner of connecting them together. And, the controller 180 may display an indicator 1890, which indicates the connected first and second polyhedrons 1810 and 1820, on the display unit 151. The controller 180 may obtain an input for connecting progress bars of the connected first and second polyhedrons 1810 and 1820 into a single progress bar. If obtaining the input for connecting the progress bars of the connected first and second polyhedrons 1810 and 1820 into the single progress bar, the controller 180 can connect the progress bar of the first polyhedron 1810 and the progress bar of the second polyhedron 1820 into the single progress bar. And, the controller 180 can connectively play a first video and a second video respectively corresponding to a first face 1811 and a second face 1821 connected to each other. Moreover, the controller 180 may connectively play the first video and the second video respectively corresponding to the first face 1811 and the second face 1821 on a single face resulting from merging the first and second faces 1811 and 1821 connected together.

The terminal 100 according to various embodiments of the present invention can connectively play videos respectively corresponding to connected faces of a plurality of connected polyhedrons and also perform a connective play in order corresponding to a connective order of a connected face. This is described with reference to FIG. 19.

FIG. 19 is a cross-sectional diagram for connected polyhedrons according to various embodiments of the present invention.

Referring to FIG. 19, the terminal 100 may obtain an input of connecting a second face 1912 of a first polyhedron 1910, a first face 1921 of a second polyhedron 1920 and a sixth face 1936 of a third polyhedron 1930 from the first polyhedron 1910, the second polyhedron 1920 and the third polyhedron 1930. The terminal 100 may obtain the input in order of connecting the second face 1912 and the first face 1921 together and then connecting the connected second face 1912 to the sixth face 1936. The terminal 100 may connectively play videos respectively corresponding to the connected second, first and sixth faces 1912, 1921 and 1936 and also play the videos connectively in order of the video corresponding to the second face 1912, the video corresponding to the first face 1921 and the video corresponding to the sixth face 1936. Thus, the terminal 100 can connectively play the videos respectively corresponding to the connected faces and may play the videos in connected order.

The terminal 100 according to various embodiments of the present invention may obtain an input for editing a prescribed section of at least one video corresponding to a selected polyhedron. In response to the obtained input, the terminal 100 may edit start and end points of the prescribed section of the at least one video, or edit the prescribed section. And, the terminal 100 may provide a recommended video, which is to be inserted in the deleted section, or a prescribed section of the recommended video. This is described with reference to FIGS. 20 to 25.

Figure 20:
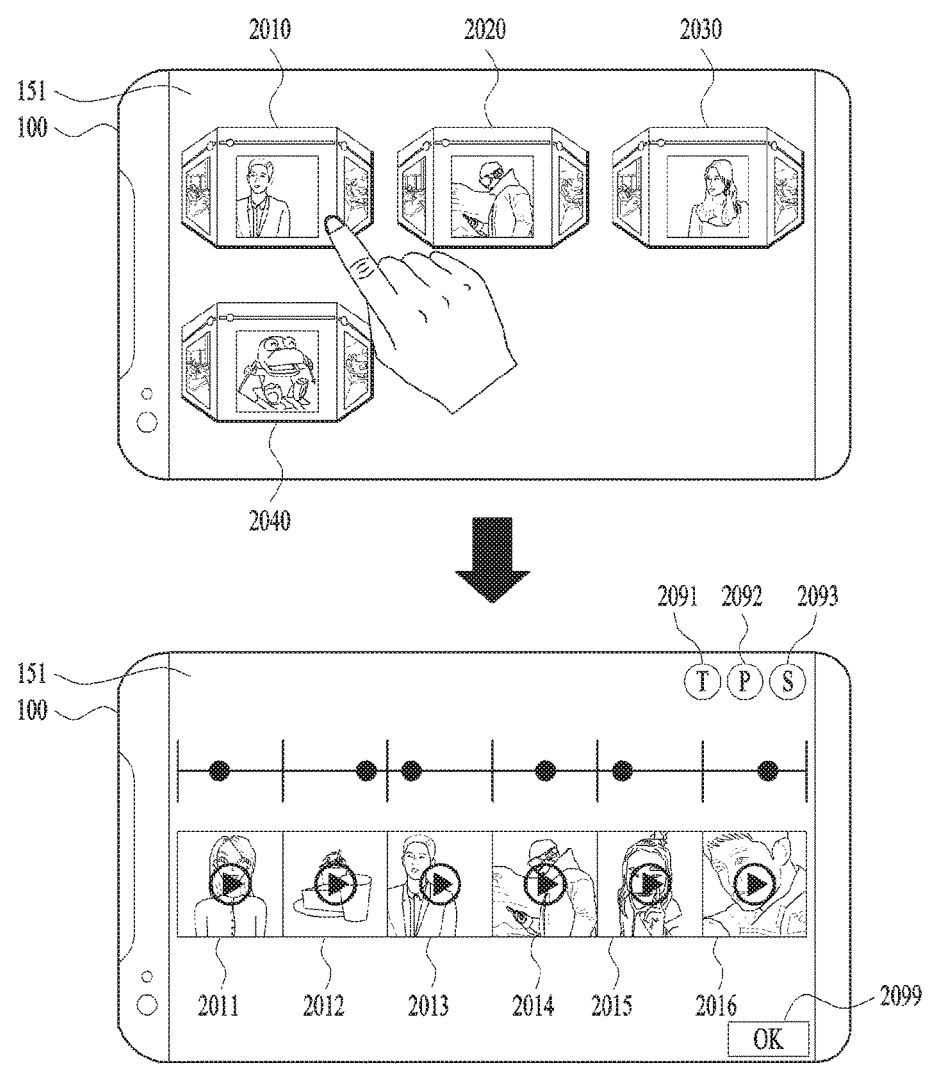
FIG. 20 is a diagram for an editing menu of videos corresponding to a polyhedron according to various embodiments of the present invention.

FIG. 20 is a diagram for an editing menu of videos corresponding to a polyhedron according to various embodiments of the present invention.

Referring to FIG. 20, the terminal 100 may display a plurality of polyhedrons 2010, 2020, 2030 and 2040 on the display unit 151. The terminal 100 may display an editing menu for editing a video corresponding to a selected polyhedron. For instance, if obtaining an input of touching a blank portion of the first polyhedron 2010, the terminal 100 can display an editing menu for editing a video corresponding to the first polyhedron 2010. For one example, the terminal 100 can display a plurality of thumbnail images 2011 to 2016 for the video corresponding to the first polyhedron 2010 and also display a progress bar corresponding to each of a plurality of the displayed thumbnail images. Herein, each of a plurality of the displayed thumbnail images 2011 to 2016 may include a thumbnail image corresponding to a plurality of surfaces included in the first polyhedron 2010. And, the terminal 100 may display an editing menu for creating the selected first polyhedron 2010 according to a new reference. For instance, as the editing menu for creating the selected first polyhedron 2010 according to a new reference, the terminal 100 can display a time condition 2091, a person condition 2092 and a scene condition 2093. Based on a selected condition, e.g., one of the time condition 2091, the person condition 2092 and the scene condition 2093, the terminal 100 can recreate the first polyhedron 2010. The recreated first polyhedron 2010 may display a new preview image on each of a plurality of faces included therein.

Described in the following description is a process for editing each face of a polyhedron in the terminal 100 in response to an input to the above-described editing menu.

Figure 21:
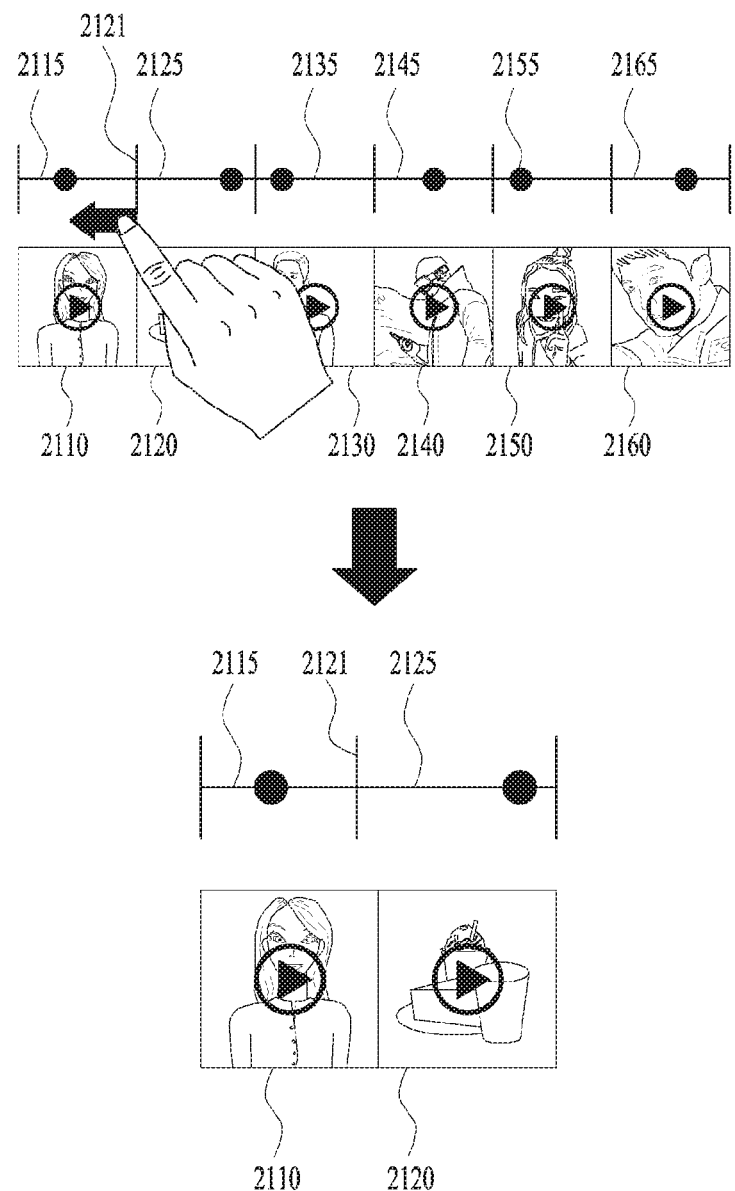
FIG. 21 and FIG. 22 are diagrams for editing faces included in a polyhedron according to various embodiments of the present invention.
Figure 22:
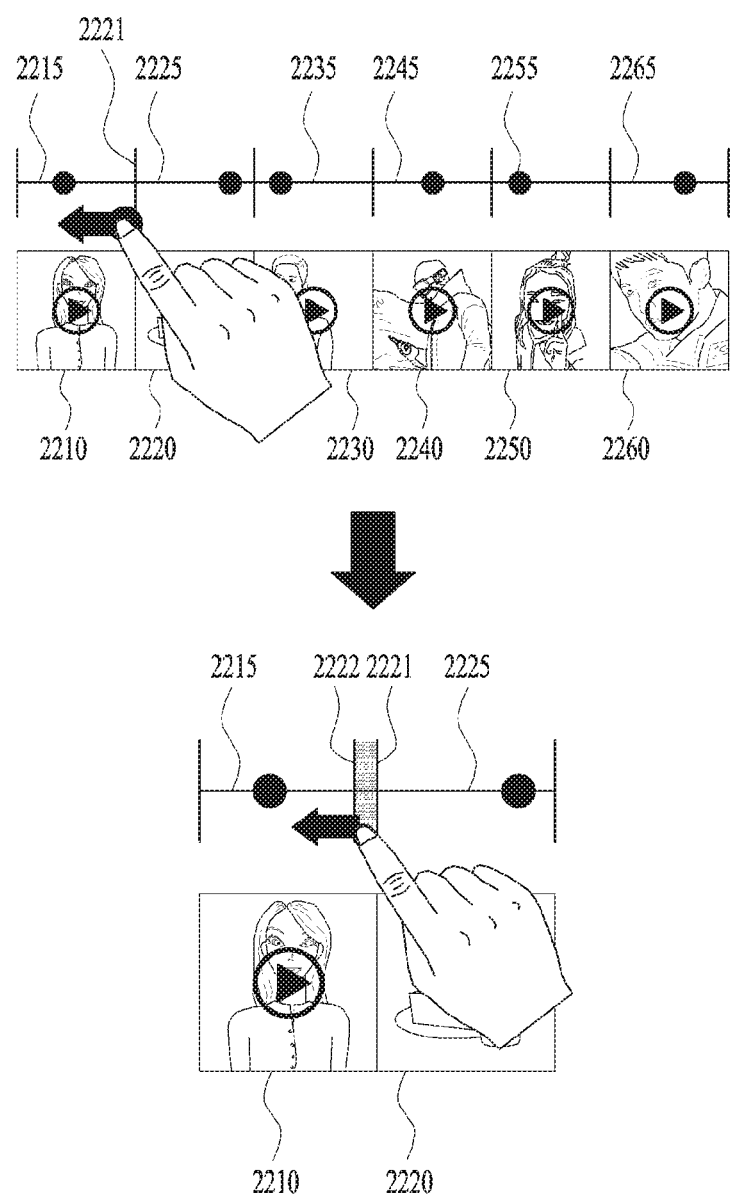

FIG. 21 and FIG. 22 are diagrams for editing faces included in a polyhedron according to various embodiments of the present invention.

Referring to FIG. 21, the terminal 100 may display thumbnail images 2110, 2120, 2130, 2140, 2150 and 2160 and progress bars 2115, 2125, 2135, 2145, 2155 and 2165, which correspond to a plurality of faces (e.g., first to sixth faces) included in a polyhedron, respectively. The terminal 100 may obtain an input for changing a start or end point of a video corresponding to at least one of a plurality of the faces. For instance, the controller 180 may obtain an input of dragging a first reference line 2121 for making a division between a section corresponding to the first face and a section corresponding to the second face. Based on the obtained input, the controller 180 can change an end point of the video corresponding to the first face and a start point of the video corresponding to the second face. According to the changed points, the controller 180 may change the thumbnail image corresponding to the first face and the thumbnail image 2120 corresponding to the second face.

Referring to FIG. 22, the terminal 100 may display thumbnail images 2210, 2220, 2230, 2240, 2250 and 2260 and progress bars 2215, 2225, 2235, 2245, 2255 and 2265, which correspond to a plurality of faces (e.g., first to sixth faces) included in a polyhedron, respectively. The terminal 100 may obtain an input for deleting a prescribed section of a video corresponding to at least one of a plurality of the faces. For instance, the controller 180 can obtain an input for deleting a prescribed section of a video corresponding to the first face. For one example, if obtaining a long touch input of long touching a first reference line 2221 for making a division between sections respectively corresponding to the first and second faces, the controller 180 can display a division line 2222 for making a division between sections. The controller 180 may obtain an input for moving the displayed division line 2222. From the video corresponding to the first face, the controller 180 may delete a section corresponding to a region between the moved division line 2222 and the first reference line 2221. As the prescribed section is deleted from the video corresponding to the first face, the controller 180 may change the thumbnail image 2210 corresponding to the first face.

The terminal 100 according to various embodiments may delete a prescribed one of a plurality of faces included in a polyhedron and also recommend a video to be added to the deleted face. This is described with reference to FIGS. 23 to 25.

Figure 23:
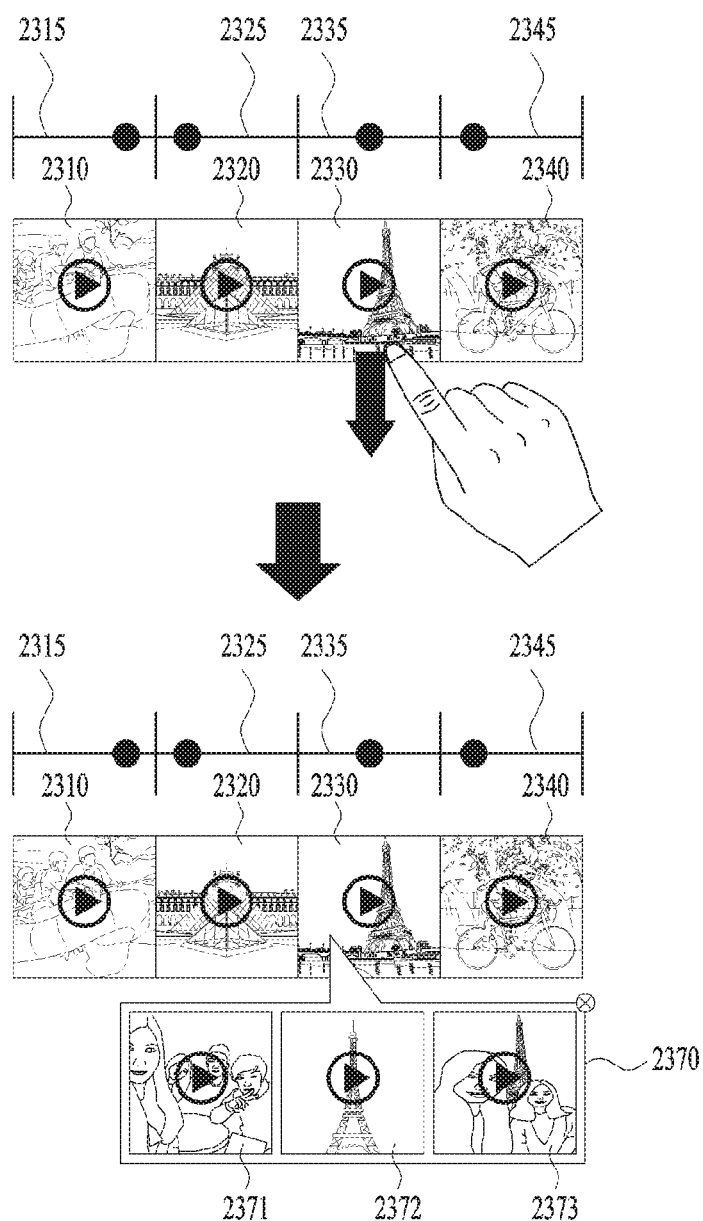
FIG. 23 is a diagram for an example of face deletion and video recommendation according to various embodiments of the present invention.

FIG. 23 is a diagram for an example of face deletion and video recommendation according to various embodiments of the present invention.

Referring to FIG. 23, the terminal 100 may display thumbnail images 2310, 2320, 2330 and 2340 and progress bars 2315, 2325, 2335 and 2345, which correspond to a plurality of faces (e.g., first to fourth faces) included in a polyhedron, respectively. The terminal 100 may obtain an input for deleting at least one of a plurality of the faces. For instance, the controller 180 can obtain an input for deleting a video corresponding to the third face. For one example, the controller 180 may obtain an input of flicking the third thumbnail image 2330 corresponding to the third face in a bottom direction. In response to the obtained input, the controller 180 can delete the third face. And, the controller 180 may provide a plurality of recommended videos addable to the deleted third face. For instance, the controller 180 can display a recommendation menu 2370 for a recommended video inputtable to the deleted third face and also display a plurality of recommended videos 2371 to 2373 on the recommendation menu 2370. For one example, based on various references, the controller 180 can provide a video related to at least one video corresponding to the polyhedron as the recommended video. For one example, if a video corresponding to the polyhedron having a prescribed face deleted is a tour video, the controller 180 can recommend a video related to the tour video as the recommended video to be added to the deleted face. In particular, the controller 180 may recommend a tour video of a place close to that of the tour video corresponding to the polyhedron with a small time difference from the tour video corresponding to the polyhedron. And, the controller 180 may recommend a video having persons overlapping with those included in the tour video corresponding to the polyhedron.

If a prescribed section is deleted, the terminal 100 according to various embodiments may recommend a video to be added to the deleted prescribed section. This is described with reference to FIG. 24.

Figure 24:
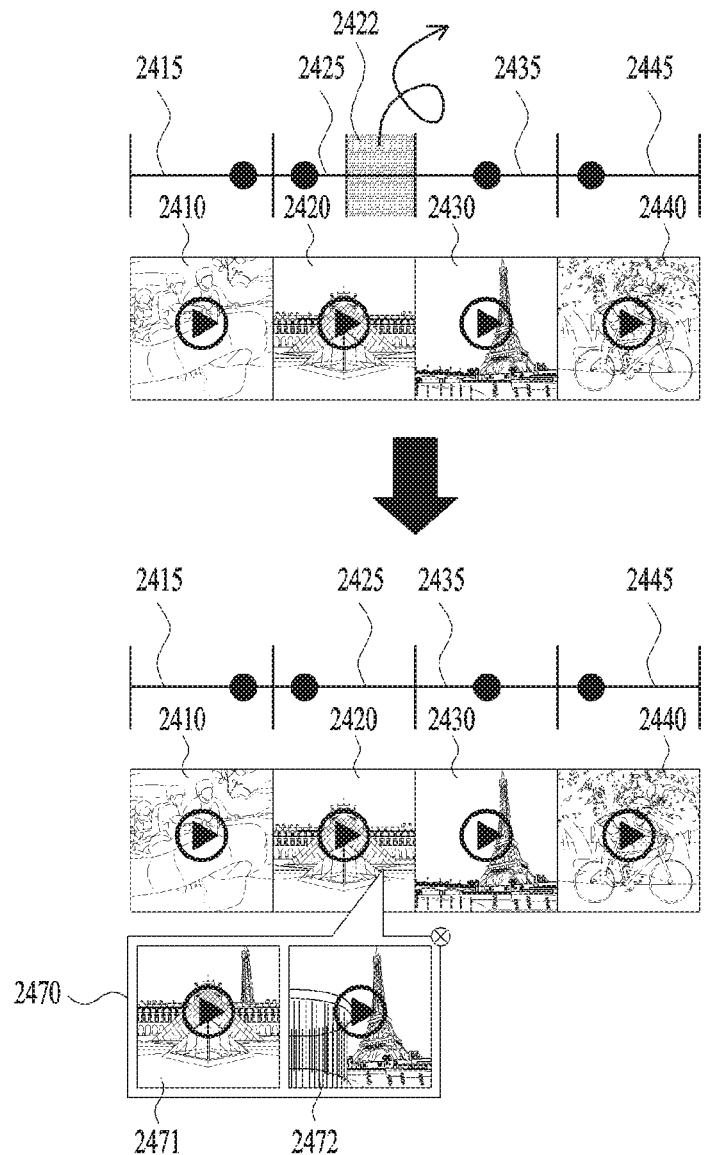
FIG. 24 is a diagram for an example of partial section deletion and recommended video offer according to various embodiments of the present invention.

FIG. 24 is a diagram for an example of partial section deletion and recommended video offer according to various embodiments of the present invention.

Referring to FIG. 24, the terminal 100 may display thumbnail images 2410, 2420, 2430 and 2440 and progress bars 2415, 2425, 2435 and 2445, which correspond to a plurality of faces (e.g., first to fourth faces) included in a polyhedron, respectively. The terminal 100 may obtain an input for deleting a prescribed section of a prescribed one of a plurality of the faces. This is mentioned in the foregoing description and its details shall be omitted. In response to the obtained input, the controller 180 can delete the prescribed section of the prescribed face. For instance, in response to the obtained input, the controller 180 can delete a prescribed section of a video corresponding to the second face. And, the controller 180 may provide a plurality of recommended videos addable to the deleted prescribed section of the second face. For instance, the controller 180 can display a recommendation menu 2470 for a recommended video inputtable to the deleted prescribed section of the video corresponding to the second face and also display a plurality of recommended videos 2471 and 2472 on the recommendation menu 2470. Based on various references, the controller 180 can provide a video to be added to the deleted prescribed section. This is mentioned in the foregoing description, and its details shall be omitted.

If a recommended video recommended for a deleted face or section is not added, the terminal 100 according to various embodiments can provide a menu for creating a new polyhedron based on videos corresponding to the rest of faces. This is described with reference to FIG. 25.

Figure 25:
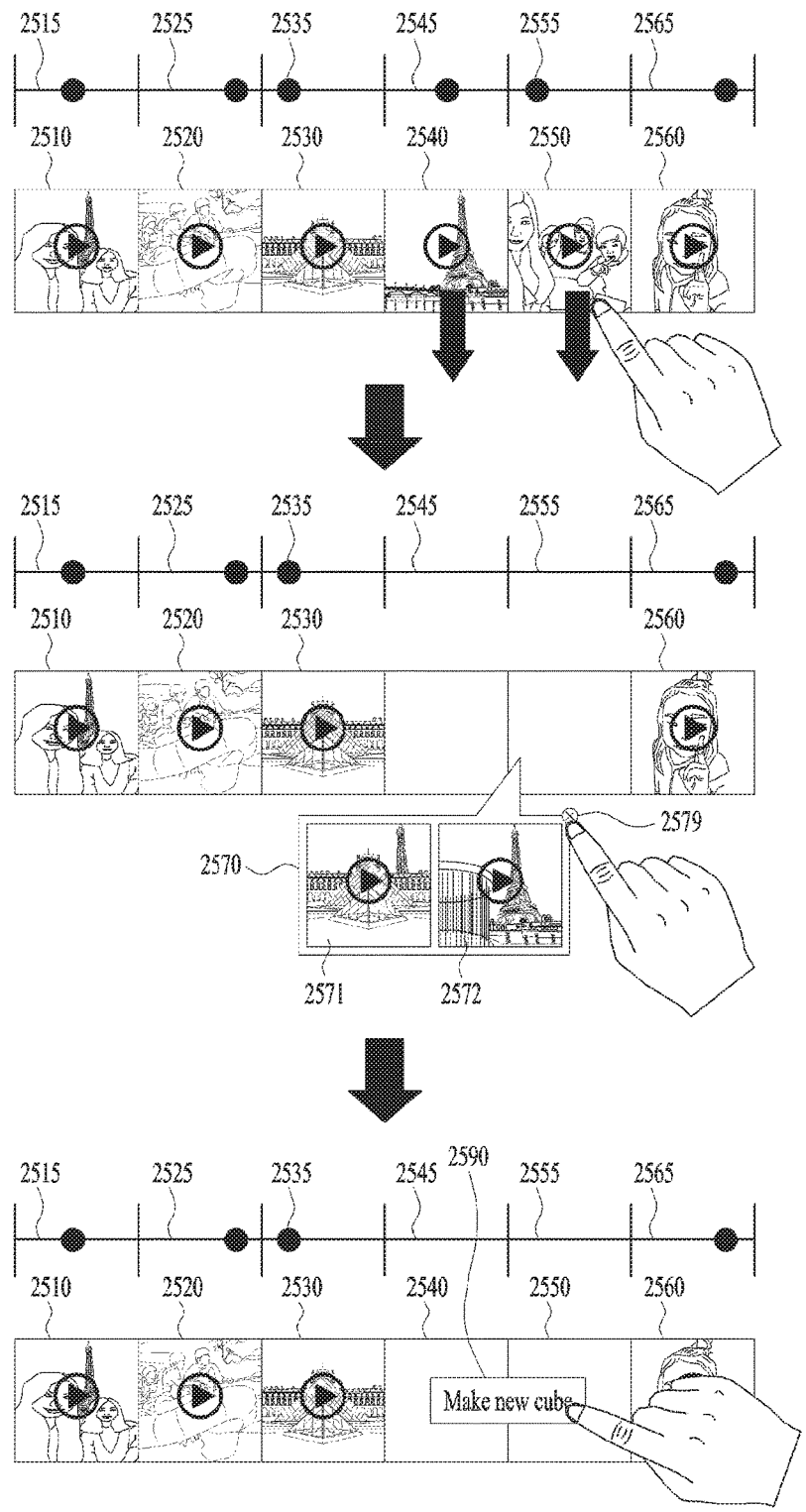
FIG. 25 is a diagram for an example of face deletion and new polyhedron creation according to various embodiments of the present invention.

FIG. 25 is a diagram for an example of face deletion and new polyhedron creation according to various embodiments of the present invention.

Referring to FIG. 25, the terminal 100 may display thumbnail images 2510, 2520, 2530, 2540, 2550 and 2560 and progress bars 2515, 2525, 2535, 2545, 2555 and 2565, which correspond to a plurality of faces (e.g., first to sixth faces) included in a polyhedron, respectively. The terminal 100 may obtain an input for deleting a prescribed section of at least one of a plurality of the faces. For instance, as an input for deleting the fourth and fifth faces among a plurality of the faces, the controller 180 can obtain an input of flicking the fourth thumbnail image 2540 corresponding to the fourth face and the fifth thumbnail image 2550 corresponding to the fifth face in a bottom direction and provide recommended video to be added to the deleted fourth and fifth faces. For instance, the controller 180 can display a recommendation menu 2570 for a recommended video inputtable to the deleted fourth and fifth faces and also display a plurality of recommended videos 2571 and 2572 on the recommendation menu 2570. If obtaining a delete button 2579 for deleting the displayed recommendation menu 2570, the controller 180 can delete the displayed recommendation menu 2570. The controller 180 may not add the new video to the deleted fourth and fifth faces but display a new polyhedron creation menu 2590 for creating a new polyhedron with videos corresponding to the rest of the faces. If obtaining an input for selecting the new polyhedron creation menu 2590, the controller 180 may create a new polyhedron based on at least one video corresponding to each of the first, second, third and sixth faces except the deleted fourth and fifth faces. For instance, based on at least one video corresponding to each of the first, second, third and sixth faces except the deleted fourth and fifth faces, the controller 180 may recommend a video addable to the fourth face and/or the fifth face and also display a gallery application menu for selecting at least one video from a plurality of videos.

The terminal 100 according to various embodiments can share a desired video or a section of the desired video and may share an edited video. This is described with reference to FIG. 26 and FIG. 27.

Figure 26:
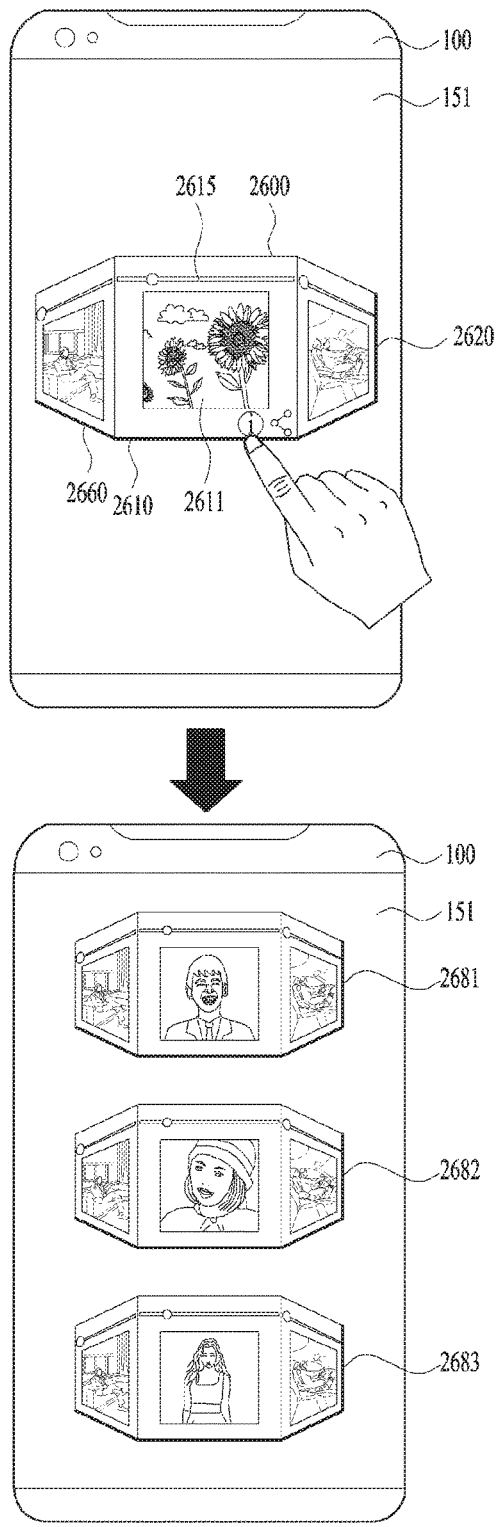
FIG. 26 is a diagram for an example of a shared video editing according to various embodiments of the present invention.

FIG. 26 is a diagram for an example of a shared video editing according to various embodiments of the present invention.

Referring to FIG. 26, the terminal 100 may display a polyhedron 2600 having a plurality of faces on the display unit 151. Each of a plurality of the faces included in the polyhedron 2600 may include a preview image for a video corresponding to each face and also include a progress bar corresponding to each face. A sharing menu for sharing may be included in each of a plurality of the faces included in the polyhedron 2600. For one example, the controller 180 can display a preview image 2611 of a video corresponding to a first face, a progress bar 2616 and a share menu 2619 on the first face 2610 of the polyhedron 2600. If obtaining an input for selecting the share menu 2619 displayed on the first face 2610, the terminal 100 may share the video corresponding to the first face 2610. Particularly, the terminal 100 may create shared videos corresponding to various conditions as the video corresponding to the selected first face 2610. And, the terminal 100 may share a shared video selected from a plurality of the created shared videos. For one example, as the videos corresponding to the selected first face 2610, the terminal 100 can display a first shared polyhedron 2681 corresponding to a shared video based on a scene, a second shared polyhedron 2682 corresponding to a shared video created based on a person, and a third shared polyhedron 2683 corresponding to a shared video created based on a place on the display unit 151. And, the terminal 100 may share the shared video corresponding to a polyhedron or surface selected from the displayed first to third shared polyhedrons 2681 to 2683.

The terminal 100 according to various embodiments can obtain an input for creating or editing a shared video and then create or edit a shared video corresponding to the obtained input.

Figure 27:
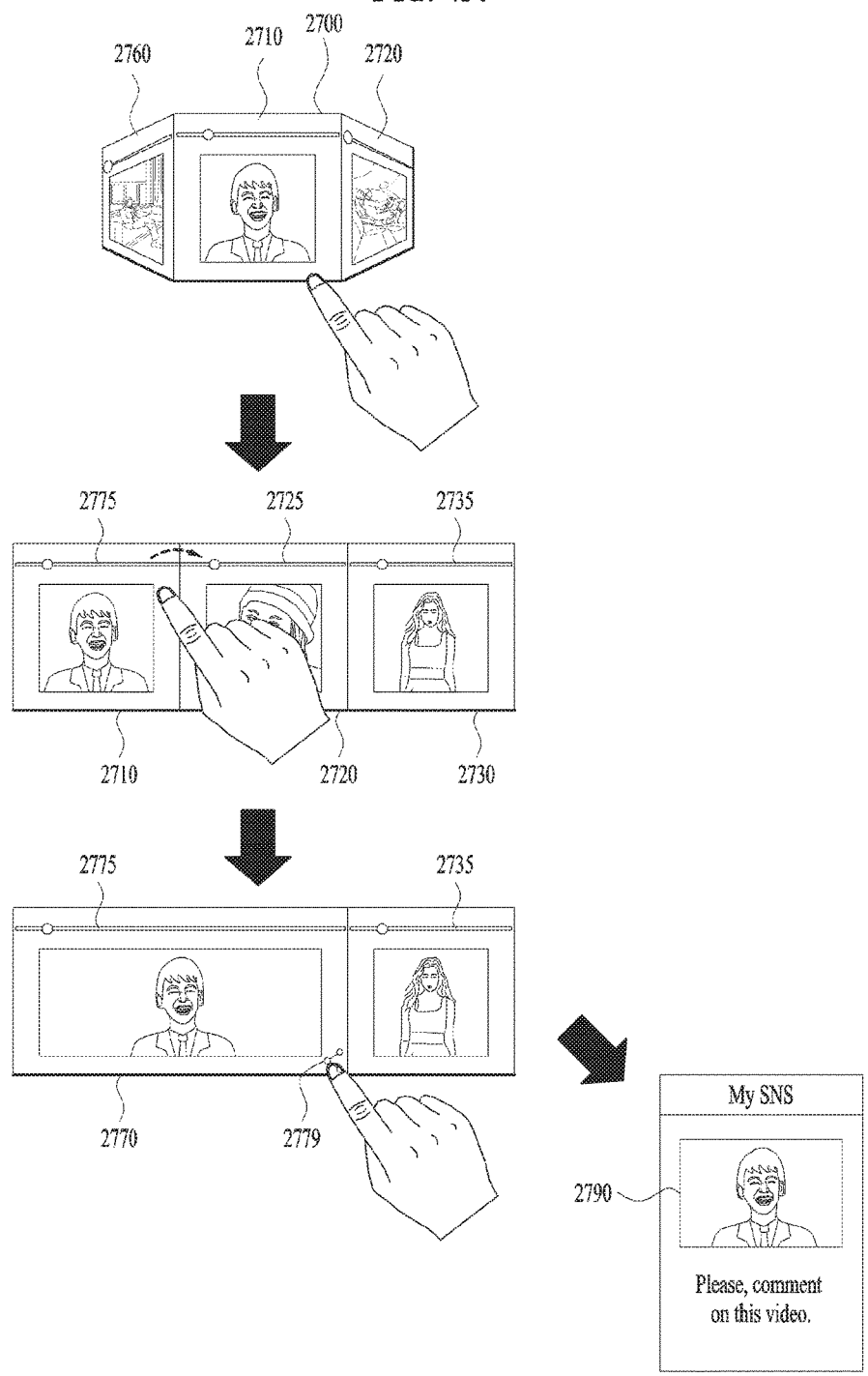
FIG. 27 is a diagram for an example of a shared video editing according to various embodiments of the present invention.

FIG. 27 is a diagram for an example of a shared video editing according to various embodiments of the present invention.

Referring to FIG. 27, the terminal 100 may display a polyhedron 2700 having a plurality of faces on the display unit 151. Each of a plurality of the faces included in the polyhedron 2700 may include a preview image for a video corresponding to each face and also include a progress bar corresponding to each face. The terminal 100 may obtain an input for editing a video corresponding to a prescribed face of the polyhedron 2700. For instance, if obtaining an input of a force touch applied in a manner of touching a first face 2710 of the polyhedron 2700 with a force over a predetermined size, the terminal 100 can display an edit menu for editing a video corresponding to the polyhedron 2700. On the displayed edit menu, the terminal 100 may display the first face 2710, a second face 2720 and a third face 2730 included in the polyhedron 2700 in a manner of unfolding the first to third faces. And, the terminal 100 may display preview images and progress bars 2715, 2725 and 2735, which correspond to the respective faces, on the unfolded first, second and third faces 2710, 2720 and 2730, respectively. The controller 180 may obtain an input for connecting one end of the first progress bar 2715 corresponding to the first face 2710 to one end of the second progress bar 2725 corresponding to the second face 2720. Based on the obtained input, the terminal 100 may connect the first and second progress bars 2715 and 2725 to each other and merge the first and second faces 2710 and 2720 together. And, the terminal 100 may display a thumbnail image corresponding to a seventh face corresponding to the merged face on the seventh face 2770. Herein, a video corresponding to the seventh face 2770 may include a video generated from connecting a video corresponding to the first face 2710 and a video corresponding to the second face 2720 to each other. The terminal 100 may obtain an input for selecting a share menu 2770 displayed on the seventh face 2770. In response to the obtained input, the terminal 100 may share the video or thumbnail image corresponding to the seventh face 2770 with SNS (social network service). For instance, the terminal 100 can upload the video 2790 corresponding to the seventh face 2770 to the SNS. Thus, the terminal 100 can share various contents based on an input to a polyhedron.

The terminal 100 according to various embodiments may display a plurality of faces in 3D shape in case of providing a 23D image like a head mounted display (hereinafter abbreviated 'HMD'). This is described with reference to FIG. 28.

Figure 28:
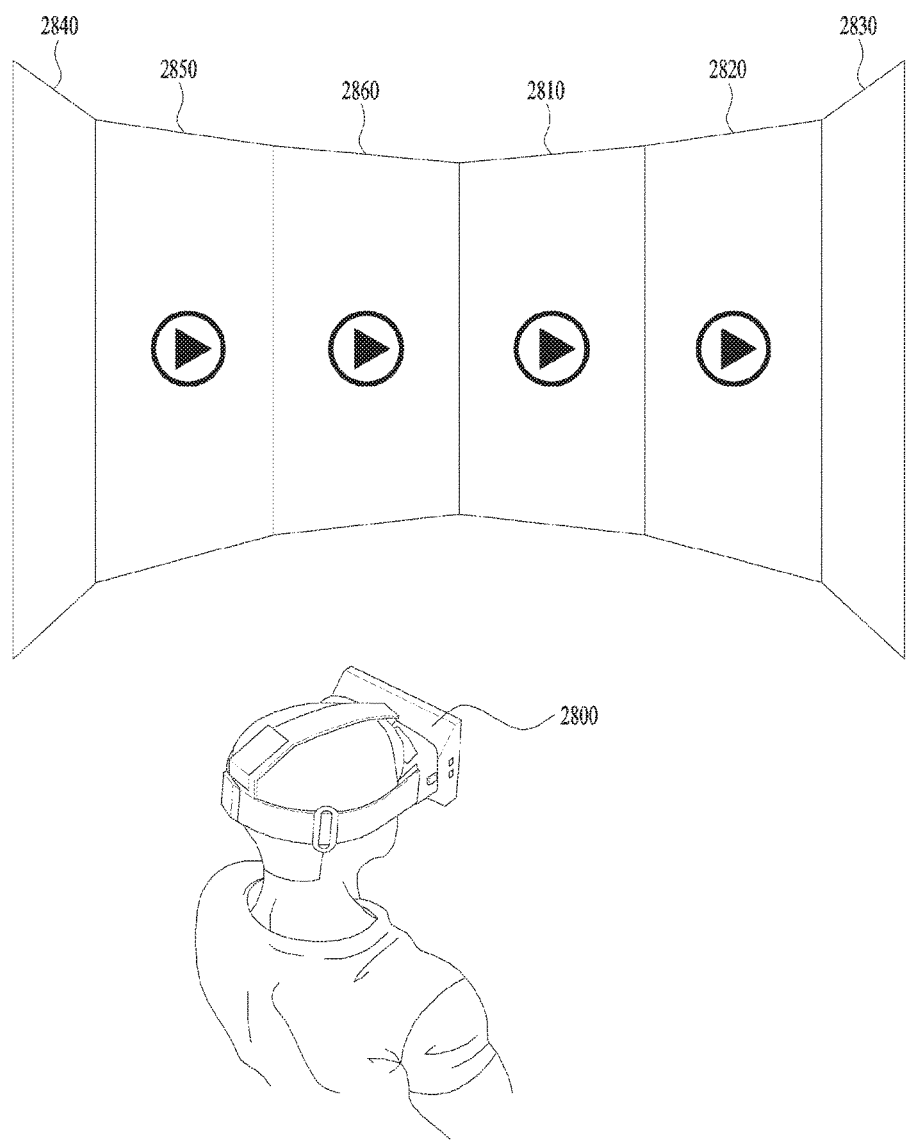
FIG. 28 is a diagram for an example of a polyhedron display in a VR video according to various embodiments of the present invention.

FIG. 28 is a diagram for an example of a polyhedron display in a VR video according to various embodiments of the present invention.

Referring to FIG. 28, the terminal 100 may output a video through an HMD 2800. And, the HMD 2800 may perform the same operations of the aforementioned terminal 100. Hence, the HMD 2800 may output a video provided by the terminal 100 and also output a video independently.

The HMD 2800 may output a video for the aforementioned polyhedron. For instance, the HMD 2800 can output 3D faces 2810, 2820, 2830, 2840, 2850 and 2860 around a user. Hence, in an outputted VR (virtual reality) video, the HMD 2800 may 3-dimensionally display a plurality of the faces 2810, 2820, 2830, 2840, 2850 and 2860 of the polyhedron around the user. As mentioned in the foregoing description, a preview image for at least one video may be displayed on each of the displayed faces 2810, 2820, 2830, 2840, 2850 and 2860 and a progress bar may be displayed as well. The HMD 2800 or the terminal 100 connected to the HMD 2800 may edit and/or share at least one video based on a user input to a plurality of the displayed faces 2810, 2820, 2830, 2840, 2850 and 2860. Thus, the terminal 100 according to various embodiments or the HMD 2800 can display the aforementioned polyhedron configuration in a VR video and play/edit/share at least one video corresponding to a polyhedron in response to an input.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A method of operating a terminal, comprising:
   receiving an input for selecting at least one video;
   dividing the at least one video into a plurality of sections;
   displaying the divided sections on a display;
   automatically selecting a plurality of sections corresponding to a preset condition for creating a polyhedron from the divided sections, the preset condition includes at least one of a person condition or a scene condition;
   creating the polyhedron displaying a preview image of the selected sections on each of a plurality of faces;
   displaying the created polyhedron on a first display region of the display;
   receiving an input for selecting at least one of the plurality of the faces of the displayed polyhedron; and
   outputting a video corresponding to the selected at least one face, wherein the outputting of the video includes displaying, on a second display region of the display, a list of at least one hash tag indicating at least one significant scene included in the video corresponding to the selected at least one face and outputting the video corresponding to a section of the at least one significant scene corresponding to a selected specific hash tag when the specific hash tag is selected from the list.

2. The method of claim 1, wherein the preview image displayed on each of the plurality of the faces comprises a thumbnail image corresponding to each of the selected sections.

3. The method of claim 1, the displaying the polyhedron comprising displaying the preview image of each of the selected sections on each of the plurality of the faces.

4. The method of claim 1, the displaying the polyhedron comprising displaying a progress bar of a video corresponding to each of plurality of the faces.

5. The method of claim 1, further comprising:
   receiving an input for rotating the displayed polyhedron; and
   displaying the rotated polyhedron in response to the received input.

6. The method of claim 5, the displaying the rotated polyhedron, comprising when receiving an input of rotating the polyhedron in a first direction, displaying at least one of a summary video of a video, a video of a significant section or a user's favorite video on a prescribed face of the polyhedron.

7. The method of claim 6, the displaying the rotated polyhedron, comprising when receiving an input of rotating the polyhedron in a second direction opposite to the first direction, displaying video information of the video on a prescribed face of the polyhedron.

8. The method of claim 1, further comprising:
   receiving an input of flicking at least one of the plurality of the faces of the polyhedron in a prescribed direction; and
   deleting the preview image displayed on the face corresponding to the received flicking input.

9. The method of claim 8, further comprising:
   displaying at least one recommended video insertable in the preview image deleted face; and
   displaying a preview image of a video selected from the displayed at least one recommended video on the preview image deleted face.

10. A terminal, comprising:
    a memory;
    a display unit displaying a video on a screen; and
    a controller configured to:
    receive an input for selecting at least one video,
    divide the at least one video into a plurality of sections,
    control the display unit to display the divided sections,
    automatically select a plurality of sections corresponding to a preset condition for creating a polyhedron from the divided sections, the preset condition includes at least one of a person condition or a scene condition,
    create the polyhedron displaying a preview image of the selected sections on each of a plurality of faces,
    control the display unit to display, on a first display region of the display unit, the created polyhedron,
    when receiving an input for selecting at least one of the plurality of the faces of the displayed polyhedron, output a video corresponding to the selected at least one face,
    control the display unit to display, on a second display region of the screen, a list of at least one hash tag indicating at least one significant scene included in the at least one video corresponding to the selected at least one face, and
    output the video corresponding to a section of the at least one significant scene corresponding to a selected specific hash tag when the specific hash tag is selected from the list.

11. The terminal of claim 10, wherein the preview image displayed on each of the plurality of the faces comprises a thumbnail image corresponding to each of the at least one video.

12. The terminal of claim 10, wherein the controller controls the display unit to display the preview image of each of the selected sections on each of the plurality of the faces.

13. The terminal of claim 10, wherein the controller controls the display unit to display a progress bar of a video corresponding to each of the plurality of the faces.

14. The terminal of claim 10, wherein the controller receives an input for rotating the displayed polyhedron and controls the display unit to display the rotated polyhedron in response to the received input.

15. The terminal of claim 14, wherein when receiving an input of rotating the polyhedron in a first direction, the controller controls the display unit to display at least one of a summary video of a video corresponding to the polyhedron, a video of a significant section or a user's favorite video on a prescribed face of the polyhedron.

16. The terminal of claim 15, wherein when receiving an input of rotating the polyhedron in a second direction opposite to the first direction, the controller controls the display unit to display video information of the video on a prescribed face of the polyhedron.

17. The terminal of claim 10, wherein the controller receives an input of flicking at least one of a plurality of the faces of the polyhedron in a prescribed direction and controls the display unit to delete the preview image displayed on the face corresponding to the received flicking input.

18. The terminal of claim 17, wherein the controller controls the display unit to display at least one recommended video insertable in the preview image deleted face and display a preview image of a video selected from the displayed at least one recommended video on the preview image deleted face.

* * * * *